United States Patent
Kerfoot

(10) Patent No.: US 8,302,939 B2
(45) Date of Patent: Nov. 6, 2012

(54) SOIL AND WATER REMEDIATION SYSTEM AND METHOD

(75) Inventor: William B. Kerfoot, Faimouth, MA (US)

(73) Assignee: ThinkVillage-Kerfoot, LLC, Boulder, CO (US)

( * ) Notice: Subject to any disclaimer, the term of this patent is extended or adjusted under 35 U.S.C. 154(b) by 517 days.

(21) Appl. No.: 12/631,596

(22) Filed: Dec. 4, 2009

(65) Prior Publication Data

US 2010/0078372 A1    Apr. 1, 2010

Related U.S. Application Data

(60) Continuation-in-part of application No. 12/272,462, filed on Nov. 17, 2008, now Pat. No. 7,661,657, which is a division of application No. 11/594,019, filed on Nov. 7, 2006, now Pat. No. 7,451,965, which is a continuation of application No. 11/146,722, filed on Jun. 7, 2005, now Pat. No. 7,131,638, which is a division of application No. 10/365,027, filed on Feb. 12, 2003, now Pat. No. 6,913,251, application No. 12/631,596, which is a continuation-in-part of application No. 12/254,359, filed on Oct. 20, 2008, now Pat. No. 7,645,384, which is a continuation of application No. 10/916,863, filed on Aug. 12, 2004, now Pat. No. 7,442,313, application No. 12/631,596, which is a continuation-in-part of application No. 11/145,871, filed on Jun. 6, 2005, now Pat. No. 7,666,316, which is a continuation-in-part of application No. 10/895,015, filed on Jul. 20, 2004, now Pat. No. 7,547,388.

(60) Provisional application No. 60/498,031, filed on Aug. 27, 2003.

(51) Int. Cl.
*B01F 3/04* (2006.01)

(52) U.S. Cl. ......... 261/30; 261/77; 261/105; 261/122.1; 210/760; 210/198.1

(58) Field of Classification Search ................ 261/30, 261/77, 105, 122.1; 210/759, 760, 198.1
See application file for complete search history.

(56) References Cited

U.S. PATENT DOCUMENTS

| | | | |
|---|---|---|---|
| 1,920,719 A | 8/1933 | Stich | |
| 2,517,525 A | 8/1950 | Cummings | |
| 2,845,185 A | 7/1958 | Winderweedle, Jr. | |
| 2,946,446 A | 7/1960 | Herbert | |

(Continued)

FOREIGN PATENT DOCUMENTS

DE    3805200    9/1998

(Continued)

OTHER PUBLICATIONS

U.S. Appl. No. 12/483,048, Response to Office Action filed Jan. 7, 2011, 10 pages.

(Continued)

*Primary Examiner* — Robert A Hopkins
(74) *Attorney, Agent, or Firm* — Lathrop & Gage LLP

(57) ABSTRACT

Method for treating contaminants at a site, especially a deep well site, includes delivering a first stream of a first gas to a first port of a laminar microporous diffuser and delivering a second stream of a second gas to a second port of the laminar microporous diffuser to effect mixing of the first and second streams of gases within the laminar microporous diffuser.

19 Claims, 14 Drawing Sheets

U.S. PATENT DOCUMENTS

| | | | |
|---|---|---|---|
| 3,027,009 A | 3/1962 | Price | |
| 3,206,178 A | 9/1965 | Lamb | |
| 3,219,520 A | 11/1965 | Box | |
| 3,276,994 A | 10/1966 | Andrews | |
| 3,441,216 A | 4/1969 | Good | |
| 3,545,731 A | 12/1970 | McManus | |
| 3,570,218 A | 3/1971 | Finney | |
| 3,669,276 A | 6/1972 | Woods | |
| 3,670,817 A | 6/1972 | Saucier | |
| 3,708,206 A | 1/1973 | Hard et al. | |
| 3,808,123 A | 4/1974 | Neel | |
| 3,814,394 A | 6/1974 | Murray | |
| 3,823,776 A | 7/1974 | Holmes | |
| 3,997,447 A | 12/1976 | Breton et al. | |
| 4,007,118 A | 2/1977 | Ciambrone | |
| 4,021,347 A | 5/1977 | Teller et al. | |
| 4,048,072 A | 9/1977 | McCullough | |
| 4,049,552 A | 9/1977 | Arff | |
| 4,064,163 A | 12/1977 | Drach et al. | |
| 4,118,447 A | 10/1978 | Richter | |
| 4,178,239 A | 12/1979 | Lowther | |
| 4,203,837 A | 5/1980 | Hoge et al. | |
| 4,268,283 A | 5/1981 | Roberts | |
| 4,298,467 A | 11/1981 | Gartner et al. | |
| 4,310,057 A | 1/1982 | Brame | |
| 4,351,810 A | 9/1982 | Martinez et al. | |
| 4,360,234 A | 11/1982 | Hsueh et al. | |
| 4,614,596 A | 9/1986 | Wyness | |
| 4,622,139 A | 11/1986 | Brown | |
| 4,639,314 A | 1/1987 | Tyer | |
| 4,684,479 A | 8/1987 | D'Arrigo | |
| 4,695,447 A | 9/1987 | Shultz | |
| 4,696,739 A | 9/1987 | Pedneault | |
| 4,730,672 A | 3/1988 | Payne | |
| 4,780,215 A | 10/1988 | Carlson | |
| 4,804,050 A | 2/1989 | Kerfoot | |
| 4,832,122 A | 5/1989 | Corey et al. | |
| 4,837,153 A | 6/1989 | Laurenson, Jr. | |
| 4,838,434 A | 6/1989 | Miller et al. | |
| 4,844,795 A | 7/1989 | Halwani | |
| 4,849,114 A | 7/1989 | Zeff et al. | |
| 4,883,589 A | 11/1989 | Konon | |
| 4,941,957 A | 7/1990 | Zeff et al. | |
| 4,943,305 A | 7/1990 | Bernhardt | |
| 4,960,706 A | 10/1990 | Bliem et al. | |
| 4,966,717 A | 10/1990 | Kern | |
| 4,971,731 A | 11/1990 | Zipperian | |
| 5,006,250 A | 4/1991 | Roberts | |
| 5,078,921 A | 1/1992 | Zipperian | |
| 5,080,805 A | 1/1992 | Houser | |
| 5,116,163 A | 5/1992 | Bernhardt | |
| 5,120,442 A | 6/1992 | Kull et al. | |
| 5,122,165 A | 6/1992 | Wang et al. | |
| 5,126,111 A | 6/1992 | Al-Ekabi et al. | |
| 5,133,906 A | 7/1992 | Louis | |
| 5,160,655 A | 11/1992 | Donker et al. | |
| 5,167,806 A | 12/1992 | Wang et al. | |
| 5,178,491 A | 1/1993 | Graves et al. | |
| 5,178,755 A | 1/1993 | Lacrosse | |
| 5,180,503 A | 1/1993 | Gorelick et al. | |
| 5,205,927 A | 4/1993 | Wickramanayake | |
| 5,215,680 A | 6/1993 | D'Arrigo | |
| 5,221,159 A | 6/1993 | Billings et al. | |
| 5,227,184 A | 7/1993 | Hurst | |
| 5,238,437 A | 8/1993 | Vowles et al. | |
| 5,246,309 A | 9/1993 | Hobby | |
| 5,248,395 A | 9/1993 | Rastelli et al. | |
| 5,254,253 A | 10/1993 | Behmann | |
| 5,259,962 A | 11/1993 | Later | |
| 5,269,943 A | 12/1993 | Wickramanayake | |
| 5,277,518 A | 1/1994 | Billings et al. | |
| 5,302,286 A | 4/1994 | Semprini et al. | |
| 5,332,333 A | 7/1994 | Bentley | |
| 5,348,664 A | 9/1994 | Kim et al. | |
| 5,362,400 A | 11/1994 | Martinell | |
| 5,364,537 A | 11/1994 | Paillard | |
| 5,375,539 A | 12/1994 | Rippberger | |
| 5,389,267 A | 2/1995 | Gorelick et al. | |
| 5,398,757 A | 3/1995 | Corte et al. | |
| RE34,890 E | 4/1995 | Sacre | |
| 5,402,848 A | 4/1995 | Kelly | |
| 5,403,476 A | 4/1995 | Bernhardt | |
| 5,406,950 A | 4/1995 | Brandenburger et al. | |
| 5,425,598 A | 6/1995 | Pennington | |
| 5,427,693 A | 6/1995 | Mausgrover et al. | |
| 5,430,228 A | 7/1995 | Ciambrone et al. | |
| 5,431,286 A | 7/1995 | Xu et al. | |
| 5,451,320 A | 9/1995 | Wang et al. | |
| 5,464,309 A | 11/1995 | Mancini et al. | |
| 5,472,294 A | 12/1995 | Billings et al. | |
| 5,480,549 A | 1/1996 | Looney et al. | |
| 5,482,630 A | 1/1996 | Lee et al. | |
| 5,520,483 A | 5/1996 | Vigneri | |
| 5,525,008 A | 6/1996 | Wilson | |
| 5,545,330 A | 8/1996 | Ehrlich | |
| 5,560,737 A | 10/1996 | Schuring et al. | |
| 5,588,490 A | 12/1996 | Suthersan et al. | |
| 5,609,798 A | 3/1997 | Liu et al. | |
| 5,615,974 A | 4/1997 | Land et al. | |
| 5,620,593 A | 4/1997 | Stagner | |
| 5,622,450 A | 4/1997 | Grant | |
| 5,624,635 A | 4/1997 | Pryor | |
| 5,663,475 A | 9/1997 | Elgal | |
| 5,664,628 A | 9/1997 | Koehler et al. | |
| 5,667,733 A | 9/1997 | Waldron, Sr., | |
| 5,676,823 A | 10/1997 | McKay et al. | |
| 5,698,092 A | 12/1997 | Chen | |
| 5,741,427 A | 4/1998 | Watts et al. | |
| 5,827,485 A | 10/1998 | Libal et al. | |
| 5,833,388 A | 11/1998 | Edwards et al. | |
| 5,851,407 A | 12/1998 | Bowman et al. | |
| 5,855,775 A | 1/1999 | Kerfoot | |
| 5,860,598 A | 1/1999 | Cruz | |
| 5,879,108 A | 3/1999 | Haddad | |
| 5,925,257 A | 7/1999 | Albelda et al. | |
| 5,954,452 A | 9/1999 | Goldstein | |
| 5,967,230 A | 10/1999 | Cooper et al. | |
| 5,975,800 A | 11/1999 | Edwards et al. | |
| 6,007,274 A | 12/1999 | Suthersan | |
| 6,017,449 A | 1/2000 | Eriksson et al. | |
| 6,083,403 A | 7/2000 | Tang et al. | |
| 6,083,407 A | 7/2000 | Kerfoot | |
| 6,086,769 A | 7/2000 | Kilambi et al. | |
| 6,136,186 A | 10/2000 | Gonzalez-Martin et al. | |
| 6,139,755 A | 10/2000 | Marte et al. | |
| 6,149,819 A | 11/2000 | Martin et al. | |
| 6,210,955 B1 | 4/2001 | Hayes | |
| 6,214,240 B1 | 4/2001 | Yasunaga et al. | |
| 6,217,767 B1 | 4/2001 | Clark | |
| 6,221,002 B1 | 4/2001 | James | |
| 6,254,310 B1 | 7/2001 | Suthersan | |
| 6,283,674 B1 | 9/2001 | Suthersan | |
| 6,284,143 B1 | 9/2001 | Kerfoot | |
| 6,306,296 B1 | 10/2001 | Kerfoot | |
| 6,312,605 B1 | 11/2001 | Kerfoot | |
| 6,352,387 B1 | 3/2002 | Briggs et al. | |
| 6,357,670 B2 | 3/2002 | Ganan-Calvo | |
| 6,364,162 B1 | 4/2002 | Johnson | |
| 6,391,259 B1 | 5/2002 | Malkin et al. | |
| 6,403,034 B1 | 6/2002 | Nelson et al. | |
| 6,428,694 B1 | 8/2002 | Brown | |
| 6,436,285 B1 | 8/2002 | Kerfoot | |
| 6,447,676 B1 | 9/2002 | Kerfoot | |
| 6,488,850 B2 | 12/2002 | Perriello | |
| 6,533,499 B2 | 3/2003 | Breeding | |
| 6,582,611 B1 | 6/2003 | Kerfoot | |
| 6,596,161 B2 | 7/2003 | Kerfoot | |
| 6,596,177 B2 | 7/2003 | Sherman | |
| 6,623,211 B2 | 9/2003 | Kukor et al. | |
| 6,645,450 B2 | 11/2003 | Stoltz et al. | |
| 6,733,207 B2 | 5/2004 | Liebert, Jr. et al. | |
| 6,736,379 B1 | 5/2004 | Wegner et al. | |
| 6,745,815 B1 | 6/2004 | Senyard | |
| 6,773,609 B1 | 8/2004 | Hashizume | |
| 6,780,329 B2 | 8/2004 | Kerfoot | |
| 6,787,038 B2 | 9/2004 | Brusseau et al. | |
| 6,805,798 B2 | 10/2004 | Kerfoot | |

| | | | |
|---|---|---|---|
| 6,818,136 | B1 | 11/2004 | Marek |
| 6,827,861 | B2 | 12/2004 | Kerfoot |
| 6,866,781 | B2 | 3/2005 | Schindler |
| 6,872,318 | B2 | 3/2005 | Kerfoot |
| 6,913,251 | B2 | 7/2005 | Kerfoot |
| 6,921,477 | B2 | 7/2005 | Wilhelm |
| 6,984,329 | B2 | 1/2006 | Kerfoot |
| 7,022,241 | B2 | 4/2006 | Kerfoot |
| 7,033,492 | B2 | 4/2006 | Kerfoot |
| 7,131,638 | B2 | 11/2006 | Kerfoot |
| 7,156,984 | B2 | 1/2007 | Kerfoot |
| 7,208,090 | B2 | 4/2007 | Applegate et al. |
| 7,264,747 | B2 | 9/2007 | Kerfoot |
| 7,300,039 | B2 | 11/2007 | Kerfoot |
| 7,442,313 | B2 | 10/2008 | Kerfoot |
| 7,537,706 | B2 | 5/2009 | Kerfoot |
| 7,547,388 | B2 | 6/2009 | Kerfoot |
| 2002/0029493 | A1 | 3/2002 | Baek |
| 2002/0109247 | A1 | 8/2002 | Jager et al. |
| 2003/0029792 | A1 | 2/2003 | Kerfoot |
| 2003/0222359 | A1 | 12/2003 | Jager |
| 2004/0045911 | A1 | 3/2004 | Kerfoot |
| 2005/0067356 | A1 | 3/2005 | Bowman et al. |
| 2006/0243668 | A1 | 11/2006 | Miller et al. |

FOREIGN PATENT DOCUMENTS

| | | |
|---|---|---|
| EP | 0402158 | 12/1990 |
| EP | 0546335 | 6/1993 |
| GB | 2005655 A | 4/1979 |
| GB | 2185901 A | 8/1987 |
| JP | 1-304838 | 12/1989 |
| JP | 3267196 | 11/1991 |
| JP | 4-171036 | 6/1992 |
| JP | 6-023378 | 1/1994 |
| JP | 6-238260 | 8/1994 |
| JP | 40931314 | 12/1997 |
| WO | WO 98/21152 | 5/1998 |
| WO | WO 99/54258 | 10/1999 |
| WO | WO9956894 | 11/1999 |
| WO | WO0226640 | 4/2002 |
| WO | WO0235908 | 5/2002 |
| WO | WO 2005063367 | 7/2005 |

OTHER PUBLICATIONS

U.S. Appl. No. 12/483,048, Office Action mailed Mar. 30, 2011, 18 pages.

U.S. Appl. No. 12/847,931, Office Action mailed Feb. 9, 2011, 11 pages.

U.S. Appl. No. 12/483,048, Response to Office Action filed May 31, 2011, 6 pages.

U.S. Appl. No. 12/483,048, Advisory Action mailed Jun. 27, 2011, 4 pages.

U.S. Appl. No. 12/847,931 Response to Office Action filed Aug. 22, 2011, 8 pages.

U.S. Appl. No. 12/847,931 Office Action mailed Jun. 20, 2011, 10 pages.

U.S. Appl. No. 12/847,931 Response to Office Action filed Apr. 25, 2011, 18 pages.

U.S. Appl. No. 12/483,048 Response to Office Action filed Sep. 30, 2011, 9 pages.

Civil Action No. 1:08-cv-11711-GAO, Groundwater & Environmental Services, Inc.'s Supplemental Response to Plaintiffs Interrogatory Three, Jun. 25, 2009, 36 pages.

Civil Action No. 1:08-cv-11711-GAO, Groundwater & Environmental Services, Inc.'s Supplemental Response to Plaintiffs Interrogatories Three and Four, Jul. 6, 2009, 164 pages.

*ThinkVillage-Kerfoot LLC* v. *Groundwater & Environmental Services, Inc.*, Complaint for Patent Infringement, US District Court for the District of Massachusetts, Oct. 7, 2008, 5 pages.

*ThinkVillage-Kerfoot LLC* v. *Groundwater & Environmental Services, Inc.*, Answer and Counterclaims, Civil Action No. 1:08-cv-11711-GAO, Dec. 5, 2008, 7 pages.

*ThinkVillage-Kerfoot LLC* v. *Groundwater & Environmental Services, Inc.*, Amended Answer and Counterclaims, Civil Action No. 1:08-cv-11711-GAO, Dec. 15, 2008, 7 pages.

*ThinkVillage-Kerfoot LLC* v. *Groundwater & Environmental Services, Inc.*,, Plaintiff's Response to Defendant Groundwater & Environmental Services, Inc.'s Amended Counterclaims, Civil Action No. 1:08- cv-11711-GAO, Dec. 30, 2008, 5 pages.

Civil Action No. 1:08-cv-11711-GAO, Groundwater & Environmental Services, Inc.'s Objections and Responses to Plaintiffs Requests for Production of Documents and Things, Mar. 4, 2009, 54 pages.

Civil Action No. 1:08-cv-11711-GAO, Groundwater & Environmental Services, Inc.'s Objections and Answers to Plaintiffs Interrogatories, Mar. 4, 2009, 10 pages.

Civil Action No. 1:08-cv-11711-GAO, ThinkVillage-Kerfoot, LLC's Responses to Defendant's Interrogatories (Nos. 1-11) Apr. 9, 2009, 12 pages.

Civil Action No. 1:08-cv-11711-GAO, ThinkVillage-Kerfoot, LLC's Objections and Responses to Defendant's First Set of Requests for Production (Nos. 1-98) Apr. 9, 2009, 37 pages.

Civil Action No. 1:08-cv-11711-GAO, ThinkVillage-Kerfoot, LLC's Supplemental Responses to Defendant's Interrogatories (Nos. 7 and 8) Jun. 2, 2009, 9 pages.

PCT/US04/43634 International Search Report mailed May 18, 2005, 1 page.

PCT/US04/43634 International Preliminary Report on Patentability, Jun. 26, 2006, 5 pages.

Makarov, A. M. & Sorokin, S.S., "Heat Exchange of a Bubble Coated with a Liquid Film on the Rear Surface," Chemical and Petroleum Engineering, vol. 30, No. 2, 1994, pp. 78-81.

Abstract JP 6-238260, Aug. 30, 1994, Karuto.

U.S. Appl. No. 09/470,167 (U.S. 6,436,285) Selected pages from File History dated Aug. 23, 2002 through Mar. 29, 2001, 38 pages.

U.S. Appl. No. 09/860,659.

U.S. Appl. No. 09/943,111.

U.S. Appl. No. 09/993,152.

U.S. Appl. No. 10/223,166 (U.S. 6,596,161) Selected pages from File History dated Nov. 6, 2002 through Jul. 22, 2003, 22 pages.

U.S. Appl. No. 10/354,584.

U.S. Appl. No. 10/365,027.

U.S. Appl. No. 10/602,256.

U.S. Appl. No. 10/745,939.

U.S. Appl. No. 10/794,994 .

U.S. Appl. No. 10/895,015.

U.S. Appl. No. 10/910,441.

U.S. Appl. No. 10/916,863.

U.S. Appl. No. 10/963,361.

U.S. Appl. No. 10/963,353.

U.S. Appl. No. 10/994,960.

U.S. Appl. No. 10/997,452.

U.S. Appl. No. 11/145,871.

U.S. Appl. No. 11/145,871, Response to Office Action filed Dec. 16, 2008, 12 pages.

U.S. Appl. No. 11/145,871, Office Action mailed Mar. 18, 2009, 16 pages.

U.S. Appl. No. 11/145,871 Response to Office Action filed Jun. 18, 2009, 10 pages.

U.S. Appl. No. 11/146,722.

U.S. Appl. No. 11/272,446 Selected pages from File History dated Jan. 22, 2008 through May 1, 2009, 60 pages.

U.S. Appl. No. 11/272,446 Supplemental Notice of Allowance May 1, 2009, 2 pages.

U.S. Appl. No. 11/328,475.

U.S. Appl. No. 11/409,892.

U.S. Appl. No. 11/485,080.

U.S. Appl. No. 11/485,080, Response to Office Action filed May 8, 2009, 4 pages.

U.S. Appl. No. 11/485,223 Office Action mailed Jun. 15, 2009, 8 pages.

U.S. Appl. No. 11/485,223.

U.S. Appl. No. 11/594,019.

U.S. Appl. No. 11/849,413.

U.S. Appl. No. 12/177,467.

U.S. Appl. No. 12/254,359, Notice of Allowance dated Apr. 1, 2009, 7 pages.

U.S. Appl. No. 12/259,051, Office Action dated Mar. 24, 2009, 6 pages.

U.S. Appl. No. 12/259,051, Response to Office Action filed Jun. 23, 2009, 8 pages.
U.S. Appl. No. 12/272,462, Restriction Requirement mailed Jun. 2, 2009, 6 pages.
U.S. Appl. No. 12/272,462, Response to Restriction Requirement filed Jul. 2, 2009, 12 pages.
U.S. Appl. No. 11/485,080, Notice of Allowance dated Jul. 9, 2009, 4 pages.
Canadian Patent Application No. 2,351,257, Office Action dated May 1, 2009, 4 pages.
PCT/US05/25478, International Search Report & Written Opinion, mailed Feb. 15, 2006, 4 pages.
PCT/US05/25478, International Preliminary Report on Patentability, Jan. 23, 2007, 4 pages.
U.S. Appl. No. 12/177,467 Notice of Allowance dated Sep. 2, 2009, 8 pages.
U.S. Appl. No. 12/259,051 Notice of Allowance dated Aug. 24, 2009, 7 pages.
U.S. Appl. No. 11/485,223 Notice of Allowance dated Sep. 2, 2009, 7 pages.
U.S. Appl. No. 11/145,871 Notice of Allowance dated Sep. 9, 2009, 7 pages.
U.S. Appl. No. 12/272,462 Notice of Allowance dated Sep. 21, 2009, 8 pages.
U.S. Appl. No. 12/254,359, Notice of Allowance dated Jul. 6, 2009, 4 pages.
U.S. Appl. No. 11/409,892, Notice of Allowance dated Oct. 1, 2009, 5 pages.
Canadian Application No. 2,441,259 Office Action dated Oct. 14, 2009, 7 pages.
Advanced Oxidation Processes for Treating Groundwater Contaminated with TCE and PCE, Aieta AXXX et al., 1988, Pilot-Scale Evaluations., Journal of American Water Works Association, JAWWAS, vol. 80, No. 5, pp. 64-72.
Echegaray, D.F. et al, "Biologically Resistant Contaminants, Primary Treatment with Ozone", Water Science and Technology, A Journal of the International Association on Water Quality, vol. 29, No. 8, 1994, pp. 257-261.
Alternate Technologies for Wastewater Treatment, J. Hauck wt al.. Polluting Engineering, May 1990, pp. 81-84.
Analysis of Selected Enhancements for Soil Vapor Extraction, U.S. Environmental Protection Agency, Sep. 1997, pp. 1-5 to 7-39.
Aquifier Remediation Wells, EPA, vol. 16, Sep. 1999, pp. 1-80.
Chemical Degradation of Aldicarb in Water Using Ozone, F.J. Beltran et al., Journal of Chemical Technology & Biotechnology, 1995, pp. 272-278.
Leonard, B., Cleaning up, Forbes, Jun. 1, 1987, pp. 52-53.
Completed North American Innovative remediation Technology Demonstration Projects, U.S. Environmental Protection Agency, Office of Solid Waste and Emergency Response, Aug. 12, 1996, pp. 1-35.
Design of a Packed Bed ozonation Reactor for Removal of Contaminants from Water, Billing, Dissertation Abstracts International, vol. 57, No. 10, Apr. 1997, pp. 6398-B.
Environmental Management:, DON Environmental Restoration Plan for Fiscal years 1997-2001, Sep. 30, 1996, pp. 4-1 to 4-8.
Factors Controlling the Removal of Organic Pollutants in an Ozone Reactor, M.D. Gurol, AWWA 1984 Annual Conference, Dallas, TX, Jun. 10-14, 1984, pp. 2-21.
Field Applications of In Situ Remediation Technologies: Chemical Oxidation, U.S. Environmental Protection Agency, Sep. 1998, pp. 1-31.
Gas Partitioning of Dissolved Volatile Organic Compounds in the Vadose Zone: Principles, ABBB Temperature Effects and Literature Review, J.W. Washington, Groundwater, vol. 34, No. 4, Jul.-Aug. 1996, pp. 709-718.
Ground Water Issue, H.H. Russell et al., u.s. Environmental Protection Agency, Jan. 1992, pp. 1-10.
Ground Water, Surface Water. and Leachate, http://www.frtr.gov/mlltrix2/section 4/4-30.html, Jul. 22, 2003, pp. 1-4.
How to Evaluate Alternative Cleanup Technologies for Underground Storage Tank Sites, U.S. Environmental Protection Agency, May 1995, 37 pages.
In Situ Air Sparging System, Tech Data Sheet. Naval Facilities Engineering Service Center, Mar. 1997, pp. 1-4.
In Situ Chemical Oxidation for Remediation of Contaminated Soil and Ground Water, EPA, Sep. 2000, Issue No. 37; pp. 1-6.
Yin, Y, PhD, In Situ Chemical Treatment, Technology Evaluation Report, GWRTAC, Jul. 1999, pp. 1-74.
R. Schaffner Jr., et al., In-Situ Air Sparging Without Inorganic Nutrient Amendment: An Effective Bioremediation Strategy for Treating Petroleum-Contaminated Groundwater Systems http://wvvw.bioremediationgroup.org/BioReferences/Tier_1_Papers/insitu.htm, Jul. 30, 203, pp. 1-14.
Beltran-Heredia, Kinetics of the Bentazone Herbicide Ozonation, Journal of Environmental Science and Health, vol. A31, No. 3, 1996, pp. 519-537.
Beltran,. Modelling Industrial Wastewater Ozonation in Bubble Contactors, Ozone Science & Engineering, vol. 17, 1995, pp. 355-378.
Beltran. Modelling Industrial Wastewater Ozonation in Bubble Contactors, Ozone Science & Engineering, vol. 17, 1995, pp. 379-398.
Newark Brownfield Site to Increase Student Housing, Environmental Alliance Monitor, http://www.envalliance.com/monitor&pubs/I998fall.htm, 1998, pp. 1-8.
Santa Barbara I Manufactured Gas Plant Site, California EPA, Jan. 2002, pp. 1-6.
P.V. Shanbhag, et al., Single-phase Membrane Ozonation of Hazardous Organic Compounds ill Aqueous Streams. Journal of Hazardous Materials 41, 1995, pp. 95-104.
Strategies to Protect Your Water Supply from MTBE, Komex Industries, http://www.komex.com/industries/remediation.htm, 2002, pp. 1-8.
Technology Status Review in Situ Oxidation, Environmental Security technology Certification Program, Nov. 1999, pp. 1-42.
The Ultrox System: USEPA Ultrox International Ultraviolet Radiation/Oxidation Technology, Applications Analysis Report, EPN540/A5-89/012, Sep. 1990.
P. Dowideit et al, Reaction of Ozone With Ethene and Its Methyl- and Chlorine-Substituted Derivatives in Aqueous Solution, Environmental Science & Technology, vol. 32, No. 8, pp. 1112-1999.
K.K. Wiegner, Toxins, toxins everywhere, Forbes, Jul. 22, 1991, pp. 298.
Bellamy, W.D et al., Treatment of VOC-Contaminated Groundwater by Hydrogen Peroxide and Ozone Oxidation, Res. J. Water Pollution Control Fed. 63, 120., 1991.
Typical Applications of Ozone, ARCE Systems, Inc., http://www.arcesystems.com/products/ozone/applications.htm, Feb. 2000, pp. 1-2.
Wheeler, K.P. et al., Who's Afraid of MTBE?, http://www.rccnet.com/Wheels.htm, Jul. 2000, pp. 1-5.
Yuma Pilot-Testing Ozone Sparging, Stripping, Pasha Publications, Defense Cleanup, Nov. 8, 1996, pp. 5-6.
U.S. Appl. No. 12/483,048, Response to Office Action filed Sep. 10, 2010, 13 pages.
U.S. Appl. No. 12/483,048, Office Action mailed Oct. 7, 2010, 21 pages.
U.S. Appl. No. 12/847,931 Notice of allowance mailed Oct. 14, 2011, 5 pages.
U.S. Appl. No. 12/483,048 Office Action mailed Oct. 12, 2011, 22 pages.
European Application No. 05793889.6 Extended European Search Report dated Dec. 15, 2011, 7 pages.
U.S. Appl. No. 12/534,662, Office Action mailed Nov. 10, 2011, 9 pages.
U.S. Appl. No. 12/483,048 Response to Office Action filed Jan. 12, 2012, 6 pages.
U.S. Appl. No. 12,483,048 Office Action Mailed Jan. 30, 2012, 6 pages.
U.S. Appl. No. 12/534,662 Response to Office Action filed Mar. 12, 2012, 12 pages.
U.S. Appl. No. 12/534,662 Office Action Mailed Apr. 6, 2012, 13 pages.
U.S. Appl. No. 12/847,931 Notice of allowance mailed Feb. 15, 2012, 8 pages.

U.S. Appl. No. 12/483,048, Advisory Action mailed Apr. 13, 2012, 4 pages.

U.S. Appl. No. 12/483,048, Response to Final Rejection filed Mar. 30, 2012, 9 pages.

Wilkins (ed.) et al. "Workshop on Monitoring Oxidation-Reduction Processes for Ground-water Restoration," EPA, (2000), 148 pages.

U.S. Appl. No. 12/483,048 Office Action dated Jan. 13, 2010, 18 pages.

U.S. Appl. No. 12/483,048, Response to Office Action filed Apr. 13, 2010, 20 pages.

U.S. Appl. No. 12/483,048, Office Action mailed Jul. 12, 2010, 19 pages.

SOIL AND WATER REMEDIATION SYSTEM AND METHOD

CROSS-REFERENCE TO RELATED APPLICATIONS

This application is a continuation-in-part of U.S. patent application Ser. No. 12/272,462, filed Nov. 17, 2008 now U.S. Pat. No. 7,661,657, which is a divisional application of U.S. patent application Ser. No. 11/594,019, filed Nov. 7, 2006, now U.S. Pat. No. 7,451,965, which is a continuation of U.S. application Ser. No. 11/146,722, filed Jun. 7, 2005, now U.S. Pat. No. 7,131,638, which was a divisional of U.S. application Ser. No. 10/365,027, filed Feb. 12, 2003, now U.S. Pat. No. 6,913,251. This application is also a continuation-in-part of U.S. patent application Ser. No. 12/254,359, filed Oct. 20, 2008, now U.S. Pat. No. 7,645,384 which is a continuation of U.S. patent application Ser. No. 10/916,863, filed Aug. 12, 2004, now U.S. Pat. No. 7,442,313, and which claims priority to U.S. Provisional Application No. 60/498,031, filed Aug. 27, 2003. This application is also a continuation-in-part of U.S. patent application Ser. No. 11/145,871, filed Jun. 6, 2005, now U.S. Pat. No. 7,666,316 which is a continuation-in-part of U.S. patent application Ser. No. 10/895,015, filed Jul. 20, 2004 now U.S. Pat. No. 7,547,388. Each of these patents and applications are hereby incorporated by reference in their entirety.

BACKGROUND

This invention relates generally to water remediation systems.

There is a well-recognized need to clean-up contaminants found in ground water, i.e., aquifers and surrounding soil formations. Such aquifers and surrounding soil formations may be contaminated with various constituents including organic compounds such as, volatile hydrocarbons, including chlorinated hydrocarbons such as dichloroethene (DCE), trichloroethene (TCE), and tetrachloroethene (PCE). Other contaminates that can be present include vinyl chloride, 1,1-trichloroethene (TCA), and very soluble gasoline additives such as methyl tertiary butyl ether (MTBE). At times these contaminants and others are found at great depths below the earth's surface. Other contaminants may also be encountered.

SUMMARY

According to an aspect, a method includes delivering a first stream of a first gas to a first port of a laminar microporous diffuser and delivering a second stream of a second gas to a second port of the laminar microporous diffuser to effect mixing of the first and second streams of gases within the laminar microporous diffuser.

The laminar microporous diffuser includes a first elongated member including at least one sidewall having a plurality of microscopic openings, said sidewall defining an interior hollow portion of said member and coupled to the first inlet port, a second elongated member including a second sidewall having a plurality of microscopic openings, said second elongated member being disposed through the interior hollow portion defined by the first elongated member and coupled to a second inlet port and an end cap to seal a first end of the microporous diffuser.

The first and second elongated members are cylinders and the second elongated member is disposed concentric to the first elongated member. The second elongated member is one of a plurality of second elongated members disposed through the first elongated member. The plurality of second elongated members are disposed through a substantial portion of a length of the first elongated member, with the second elongated members including caps to terminate ends of the second elongated members.

In some embodiments an ozone generator is coupled to the first inlet. The ozone generator and a pump to supply air are arranged so that the ozone generator works under a siphon condition to efficiently deliver ozone to the microporous diffuser. The microporous diffuser is disposed in a well at a depth exceeding a depth that produces a back pressure on an ozone generator that would effectively reduce the efficiency of ozone production by the ozone generator by 50%. The microporous diffuser emits microbubbles having a size in a range of 1 to 200 microns. The microporous diffuser is disposed at a vertical depth in excess of 180 feet from the surface of the earth.

According to a further aspect, an apparatus includes a well, a first pump to deliver a first stream of gas, a second pump to deliver a second stream of gas and a laminar microporous diffuser disposed in the well, the laminar microporous diffuser having a top cap with first and second inlet ports coupled to the first and second pumps. The laminar microporous diffuser includes a first elongated member forming one sidewall having a plurality of microscopic openings, said sidewall defining an interior hollow portion of the first member with the interior portion coupled to the first inlet port, a second elongated member forming a second sidewall having a plurality of microscopic openings, said second elongated member defining a second interior portion and being disposed through the hollow portion of said first elongated member, with the second interior portion being coupled to a second inlet port, and an end cap to seal a second end of the laminar microporous diffuser with the first pump delivering the first gas stream to peripheral portions of the laminar microporous diffuser and the second pump delivering the second stream of gas to central portions of the laminar microporous diffuser, with the second stream of gas migrating to peripheral portions of the laminar microporous diffuser to effect mixing of the first and second streams of gases within the laminar microporous diffuser.

Other embodiments include an ozone generator coupled to the first port and wherein the first gas is ozone and the second gas is air. The first and second elongated members are cylinders and the second elongated member is disposed concentric to the first elongated member. The second elongated member is one of a plurality of second elongated members disposed through the first elongated member. The plurality of second elongated members are disposed through a substantial portion of a length of the first elongated member, and with the second elongated members including caps to terminate ends of the second elongated members.

The ozone generator and pump to supply air are arranged so that the ozone generator works under a siphon condition to efficiently deliver ozone to the microporous diffusers. The microporous diffuser is disposed in the well at a depth exceeding a depth that produces a backpressure on the ozone generator that would effectively reduce by 50% the efficiency of ozone production by the ozone generator. The microporous diffuser emits microbubbles having a size in a range of 0.5 to 200 microns, more specifically from about 1 micron to 100 microns.

According to a still further aspect, an apparatus includes a first pump to deliver a first stream of gas, a second pump to deliver a second stream of gas, a laminar microporous diffuser coupled to the first and second pumps, the laminar microporous diffuser including a top cap with first and second inlet ports, the laminar microporous diffuser having an interior hollow portion coupled to the first inlet port and a second interior portion disposed through the first hollow portion, with the second interior portion being coupled to the second inlet port and an end cap to seal a second end of the laminar microporous diffuser with the first pump delivering the first gas stream to peripheral portions of the laminar microporous diffuser and the second pump delivering the second stream of gas to central portions of the laminar microporous diffuser, with the second stream of gas migrating to peripheral portions of the laminar microporous diffuser to effect mixing of the first and second streams of gases within the laminar microporous diffuser.

Other embodiments include an ozone generator coupled to the first pump and wherein the first gas is ozone and the second gas is air. The ozone generator and the pump to supply air are arranged so that the ozone generator works under a siphon condition to efficiently deliver ozone to the microporous diffusers. This permits the microporous diffuser to be disposed in a well at a depth exceeding a depth that produces a backpressure on the ozone generator that would effectively reduce the efficiency of ozone production by the ozone generator. The microporous diffuser emits microbubbles having a size in a range of 1 to 200 microns.

According to an aspect, a method includes treating a site contaminated with toxic organic compounds by assessing for the presence or absence of suitable ozonophilic bacteria at the site; and introducing ozone to the site.

Ozonophilic bacteria may be introduced to a site if ozonophilic bacteria are not present or not present in sufficient quantities in the site. The concentration and rate of ozone introduced is determined based on the presence or absence of the suitable ozonophilic bacteria present at the site. Ozone is introduced to the site in an amount sufficient to stimulate growth of the suitable ozonophilic bacteria. Ozone is introduced to the site in an amount sufficient to stimulate growth of the suitable ozonophilic bacteria without killing suitable ozonophilic bacteria outside a distance of about one meter from the location of ozone introduction to the site. The ozone is introduced to the site in an amount in a range of 1 to 300 ppmv to stimulate growth of suitable ozonophilic bacteria in a distal region from the location of ozone introduction to the site.

According to an additional aspect, a method includes treating a site contaminated with toxic organic compounds by assessing the presence of bacteria from the genera: *Microbacterium, Gordonia* (2), *Hydrogenophaga, Nocardia, Rodococcus, Spingomonas, Xanthobacteria, Algallgenes* (2), *Mycobacteria, Rubrivivax, Arthrobacter, Acidovorax, Burkholderia, Variovarax,* or *Pseudomonas*; and introducing an oxidant to the site.

Embodiments include those where the oxidant is ozone or ozone/hydrogen peroxide. The ozone is introduced to the site in an amount sufficient to stimulate growth of the bacteria. The ozone is introduced to the site in an amount sufficient to stimulate growth of bacteria without killing bacteria outside a distance of about one meter from the location of ozone introduction to the site. The oxidant is oxygen or oxygen-enriched air.

According to additional aspects, a method of treating a site contaminated with toxic organic compounds includes identifying the amount of bacteria present at the site and introducing additional bacteria to the site and introducing ozone to the site.

Ozone is introduced into the site in microbubbles. The microbubbles are introduced using a microporous diffuser. The additional bacteria include at least one genera of *Microbacterium, Gordonia* (2), *Hydrogenophaga, Nocardia, Rodococcus, Spingomonas, Xanthobacteria, Algallgenes* (2), *Mycobacteria, Rubrivivax, Arthrobacter, Acidovorax, Burkholderia, Variovarax,* or *Pseudomonas*. Ozone is introduced in a continuous manner or in a pulsed manner.

According to an additional aspect, a method of treating a site contaminated with petroleum compounds includes identifying the amount of bacteria present at the site and introducing ozone to the site in an amount insufficient to kill bacteria beyond about one meter of the location of ozone introduction to the site.

According to an additional aspect, a method of treating a site contaminated with toxic organic compounds includes obtaining a sample of the site soil, sand or water, assessing the level of and type of bacteria present in the sample; introducing bacteria to the site, if insufficient levels of bacteria are present or an ozonphilic bacteria is not present in the site; and introducing ozone to the site.

The additional bacteria are introduced if the existing levels are less than about 10,000 cfu/mL in a groundwater sample or less than about 25,000 cfu/gm in a soil sample. The additional bacteria are introduced if the type of bacteria is not from at least one of the genera *Microbacterium, Gordonia* (2), *Hydrogenophaga, Nocardia, Rodococcus, Spingomonas, Xanthobacteria, Algallgenes* (2), *Mycobacteria, Rubrivivax, Arthrobacter, Acidovorax, Burkholderia, Variovarax,* or *Pseudomonas*. The additional bacteria are introduced if the type of bacteria is not from at least one genera of the *Microbacterium,* the *Burkordiua,* the *Pseudomonas* and the *Xanthobacteria* genera. The ozone is introduced in an amount resulting in proliferation of the bacterial population. The ozone is introduced to the site in an amount in a range of 1 to 300 ppmv to stimulate growth of bacteria in a distal region from the location of ozone introduction to the site. The amount of bacteria introduced to the contaminated site is adjusted based on the result of the assessed levels of toxic organic compounds in the sample. The oxygen concentration in the site is maintained at a level to inhibit bacterial growth within a critical plugging radius to the injection screen, but bacterial growth is promoted at distances beyond a critical radius about the site of introduction.

According to an aspect, a method includes introducing an air stream including ozone delivered with a permanganate to decompose contaminants, with the permanganate to ozone molar ratio being 1-20 to 1.

The permanganate may be delivered as a coating over microbubbles including the air/ozone gas stream. Air and ozone may be introduced into the soil through a microporous diffuser, where air and ozone are the gas and permanganate is a liquid. The microporous diffuser includes promoters or nutrients such as catalyst agents including iron containing compounds such as iron silicates or palladium containing compounds such as paladized carbon and platinum that contact microbubbles that emanate from the microporous diffusers. The microporous diffusers have a pore size in the range of about 0.1 to 200 microns. The air/ozone has up to 10% ozone by volume as a gas entrapped in microbubbles. The permanganate is up to 40 percent liquid volume as a liquid that coats the microbubbles. The air and ozone gas mixture may be entrapped in microbubbles and sodium permanganate may be a liquid coating over the microbubbles. The permanganate may be selected from the group consisting of sodium permanganate and potassium permanganate and a precursor; and potassium manganate.

According to an additional aspect, a method of treating contaminants in a formation includes introducing a hydroperoxide into the formation and introducing an air/ozone gas stream delivered with a permanganate into the formation to decompose the contaminants.

The permanganate is delivered as a surface layer over microbubbles including the air/ozone gas stream. The hydroperoxide is delivered as a surface layer over microbubbles including an air/ozone gas stream. Introducing peroxide includes introducing air and ozone as a gas and the hydroperoxide as a liquid into a microporous diffuser. Introducing permanganate includes introducing air and ozone as a gas and the permanganate as a liquid into a microporous diffuser. The method includes waiting for a period of time after introducing the hydroperoxide before introducing the permanganate to allow the hydroperoxide to decompose before introducing the permanganate. The microporous diffusers have a pore size in the range of about 0.1 to 200 microns. Introducing includes introducing air and ozone as a gas entrapped in microbubbles and sodium permanganate as a liquid coating over the microbubbles. The air/ozone is ozone up to 10% volume as a gas entrapped in microbubbles and potassium permanganate is in a ratio of 1-20 to 1 of permanganate to ozone.

According to an additional aspect, an apparatus includes a source of permanganate, a diffuser that allows delivery of the permanganate and air ozone to a soil formation and a mechanism to deliver the permanganate and air/ozone to the diffuser. The apparatus also includes a controller to control delivery of the permanganate and the air/ozone to the mechanism.

The combination of ozone and permanganate allows fast-acting ozone to react with 1,4-dioxane, benzene, and its derivatives, expanding the oxidative potential of the permanganate with other compounds.

Because permanganate is transported with microbubbles, it is actively dispersed rather than relying on density alone to distribute the permanganate. Thus, the microbubble transport mechanism provides better diffusion and distribution of permanganate laterally, since buoyancy will push the coating laterally and upwards through the formation, reducing the tendency to form dense vertical chimneys with only lateral spreading in highly permeable layers by downwards density spreading. The buoyancy of the microbubbles can be controlled by adjusting density of the permanganate and thickness on the microbubble. The density of the permanganate coating on the microbubbles allows for the adjustment of the buoyancy of the coated micro or nano sized bubbles, since with a thick enough coating neutral buoyancy can be reached.

The microbubbles allow for a more effective distribution of the permanganate in both lateral and vertical dimensions than density-driven dispersion of prior techniques. With use of bubble surging or pulsing the bubbles can remove $CO_2$ and loosen up crust formations, improving longer-term reactivity of permanganate. The coating of sodium or potassium permanganate on the microbubbles draws contaminates such as highly volatile or volatile organic compounds to the permanganate coating according to Henry's Constant, thus reducing side reactions of the sodium or potassium permanganates with mineral surfaces in the soil substrate. Through the use of Henry's partitioning from liquid to gas, volatile organic ethenes are "extracted" or drawn into the coating improving reaction efficiency.

The combination of the ozone-air in the microbubbles and the permanganate increases the oxidation potential of the permanganate, allowing treatment of 1,4-dioxane, mixed with chloroethenes. Examples of permanganates include sodium and potassium permanganates.

The details of one or more embodiments are set forth in the accompanying drawings and the description below. Other features, objects, and advantages of the invention will be apparent from the description and drawings, and from the claims.

DETAILED DESCRIPTION

Deep Well Sparging

Figure 1:
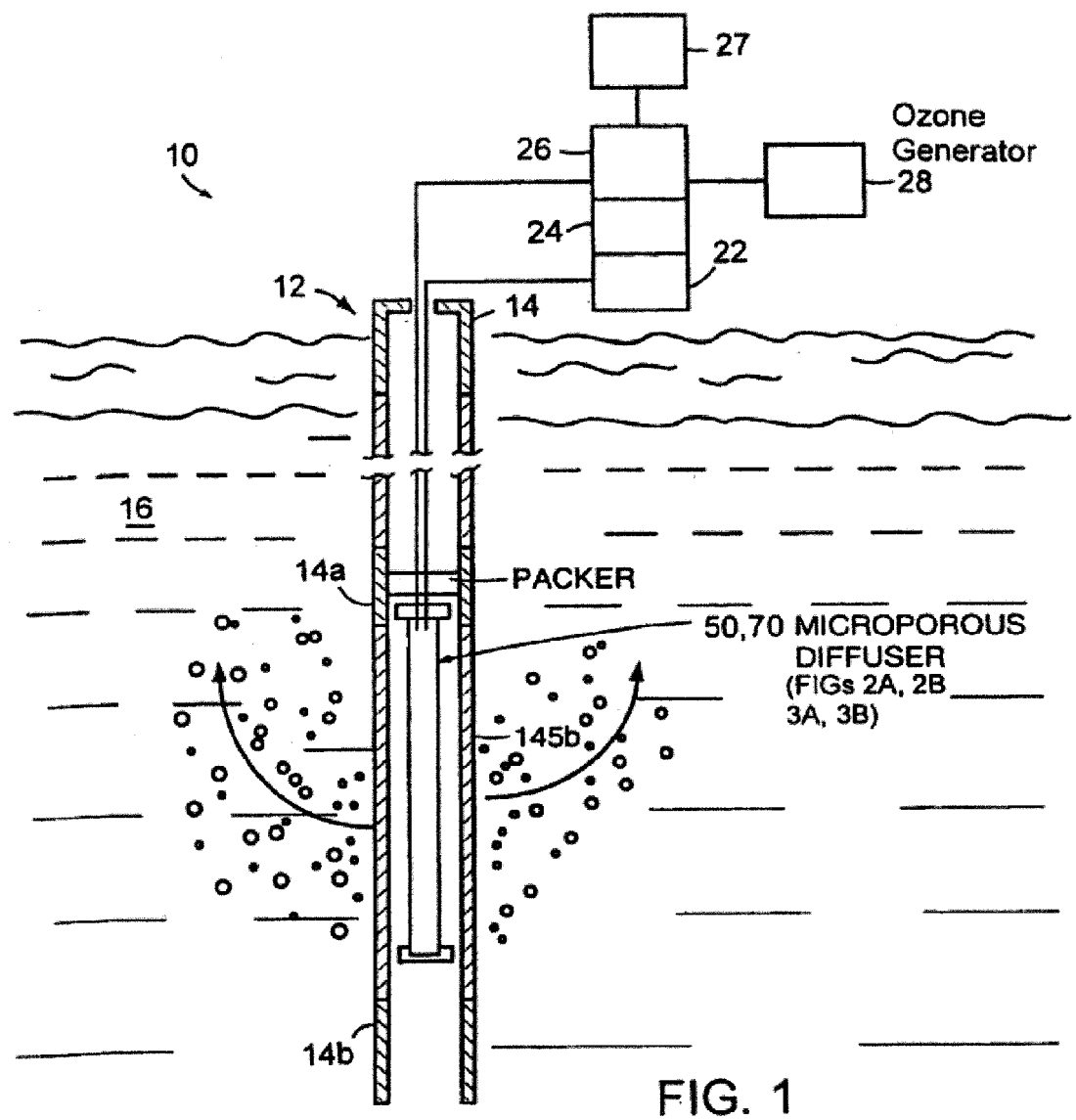
FIG. 1 is a cross-sectional view showing a sparging treatment example, adapted for sparging at great depths below the surface of the earth.

Referring now to FIG. 1, a sparging arrangement 10 for treating plumes, sources, deposits or occurrences of contaminants, is shown. The arrangement 10 is disposed in a well 12 that has a casing 14 with an inlet screen 14a and outlet screen 14b to promote a recirculation of water into casing 14 and through the surrounding ground/aquifer region 16. Casing 14 supports the ground about well 12. Generally, well 12 is deep, e.g., beyond 200 feet or so, but it can be a shallow well, e.g., less than 200 feet or so. Disposed through casing 14 are one or more microporous diffusers, e.g., 50 or 70 (discussed in FIG. 2A-2B or 3A-3B). Arrangement 10 also includes a first air compressor/pump 22 and, a compressor/pump control mechanism 24 to feed air into the microporous diffuser, and a second pump 26 and control 27 coupled to an ozone ($O_3$) generator 28 to feed a separate-feed of ozone to the microporous diffuser. The compressor/pump 22 feeds a stream of air into microporous diffuser 50 or 70, whereas second pump 26 feeds a stream of ozone ($O_3$) from ozone generator 28 into microporous diffuser 50 or 70. Exiting from walls of microporous diffuser 50 or 70 are microbubbles of air and ozone. Such encapsulated micron sized bubbles of air/ozone affect substantial removal of contaminants. Arrangement 10 can also include a pump (not shown) that supplies nutrients such as catalyst agents including iron-containing compounds such as iron silicates or palladium-containing compounds such as palladized carbon. In addition, other materials such as platinum may also be used.

Arrangement 10 makes use of laminar microporous diffusers 50, 70. Laminar microporous diffusers 50, 70 allow introduction of multiple gas streams, and have at least two inlets.

At least one of the inlets introduces a first gas stream about the periphery of laminar microporous diffusers 50, 70 and another inlet introduces a second gas stream within interior regions of laminar microporous diffusers 50, 70. The gas streams can be the same gas, or preferably different gases. In the embodiment described, the first gas stream is ozone and the second is air. This allows ozone generator 28 to work under a siphon condition rather than requiring a high backpressure condition in order to efficiently deliver ozone and produce micron sized bubbles of air/ozone at great depths in well 12. Having ozone generator 28 under a siphon condition is advantageous for operation of ozone generator 28 at optimal efficiency and delivery of optimal amounts of ozone into well 12, especially if ozone generator 28 is a corona discharge type. Pump 22 feeds an air stream and induces a negative pressure on the ozone stream that is fed from pump 26 when both streams are fed through microporous diffusers 50, 70.

In particular, with microporous diffusers 50 and 70 and use of an outer port to introduce a stream of ozone, the microbubbles are produced in the microporous diffuser by bubbling air through a central cylinder of microporous diffusers 50, 70 and into the surrounding outer regions of microporous diffusers 50, 70 where it is mixed with ozone. This arrangement thus can be used to treat deposits of contaminants. While it can treat shallow deposits it is especially useful to treat deposits that are deep into the earth's surface since by producing a negative pressure it allows the ozone stream to overcome the backpressure in well 12 without requiring ozone generator 28 to work under high backpressure conditions. Corona type ozone generators tend to lose efficiency when operated at high backpressures. For instance, doubling of pressure in the ozone generator to overcome large backpressures can result in an effective reduction by 75% in ozone production compared to what the ozone generator could produce at ambient pressure conditions. Under this arrangement ozone can be supplied at a flow rate of, for example, 0.5-50 cubic feet per hour (CFH) of ozone and 2 to 20 cubic feet per minute of air. An exemplary set of rates is for 2-inch wells 3-5 CFM total gas (air and ozone) with ozone being $1/20^{th}$ to $1/100^{th}$ of the total volume.

The fine bubbles promote rapid gas/gas/water reactions with volatile organic compounds, in which a substrate (catalyst or enhancer) participates in, instead of solely enhances, dissolved (aqueous) disassociation and reactions. The production of microbubbles and selection of appropriate size distribution is provided by using microporous material and a bubble chamber for optimizing gaseous exchange through high surface area to volume ratio and long residence time within the liquid to be treated. The equipment promotes the continuous production of microbubbles while minimizing coalescing or adhesion.

The injected air/ozone combination moves as a fluid into the material to be treated. The use of microencapsulated ozone enhances and promotes in-situ stripping of volatile organics and simultaneously terminates the normal reversible Henry's reaction. The process involves promoting simultaneous volatile organic compounds (VOC) in-situ stripping and gaseous decomposition with moisture (water) and substrate (catalyst or enhancer). The basic chemical reaction mechanism of air/ozone encapsulated in microfine bubbles is further described in several issued patents such as U.S. Pat. No. 5,855,775, which is incorporated herein by reference.

The compounds commonly treated are HVOCs (halogenated volatile organic compounds), PCE, TCE, DCE, vinyl chloride (VC), EDB, petroleum compounds, aromatic ring compounds like benzene derivatives (benzene, toluene, ethylbenzene, xylenes). In the case of a halogenated volatile organic compound (HVOC), PCE, gas/gas reaction of PCE to byproducts of HCl, $CO_2$ and $H_2O$ accomplishes this. In the case of petroleum products like BTEX (benzene, toluene, ethylbenzene, and xylenes), the benzene entering the bubbles reacts to decompose to $CO_2$ and $H_2O$.

Also, pseudo Criegee reactions with the substrate and ozone appear effective in reducing saturated olefins, like trichloro alkanes (1,1,1-TCA), carbon tetrachloride ($CCl_4$), chloroform and methyl chloride. When ozone is catalyzed by peroxide or iron (normally ferrous), hydroxyl radicals are released which raise the oxidation potential of the ozone combination to 2.80V, allowing direct attack of the saturated bonds. These reactions initiate complex free-radical-induced oxidations of the ether-like compounds (MTBE, ETBE, 1,4-dioxane). With MTBE, for example, peroxide may be continually formed at the bubble interface from breakdown products and recombine with ozone to continually renew free-radical formation.

Other contaminants that can be treated or removed include hydrocarbons and, in particular, volatile chlorinated hydrocarbons such as tetrachloroethene, trichloroethene, cis-dichloroethene, trans-dichloroethene, 1,1-dichloroethene and vinyl chloride. In particular, other materials can also be removed including chloroalkanes, including 1,1,1-trichloroethane, 1,1-dichloroethane, methylene chloride, and chloroform. Also, aromatic ring compounds such as oxygenates such as o-xylene, p-xylene, naphthalene and polyaromatic hydrocarbons (PAHs).

Ozone is an effective oxidant used for the breakdown of organic compounds in water treatment. The major problem in effectiveness is that ozone has a short lifetime. If ozone is mixed with sewage containing water above ground, the half-life is normally minutes. Ozone reacts quantitatively with PCE to yield breakdown products of hydrochloric acid, carbon dioxide, and water.

To offset the short life span of ozone, the ozone is injected with microporous diffusers, enhancing the selectiveness of action of the ozone. By encapsulating the ozone in fine bubbles, the bubbles would preferentially extract a vapor phase fraction of the volatile organic compounds they encountered. With this process, a vapor phase according to a partition governed by Henry's Law, of the volatile organics are selectively pulled into the fine air-ozone bubbles. The gas that enters a small bubble of volume ($4\pi r^3$) increases until reaching an asymptotic value of saturation. The ozone in the bubbles attacks the volatile organics, generally by a Criegee, Criegee-like reaction or free-radical induced oxidations.

The following characteristics of the contaminants appear desirable for reaction:

| | |
|---|---|
| Henry's Constant: | $10^{-2}$ to $10^{-4}$ $m^3$ atm/mol |
| Solubility: | 10 to 20,000 mg/l |
| Vapor pressure: | 1 to 3000 mmHg |
| Saturation concentration: | 5 to 9000 g/$m^3$ |

The production of microbubbles and selection of appropriate size distribution are selected for optimized gas exchange through high surface area to volume ratio and long residence time within the area to be treated. The microbubbles are generated by using microporous materials in microporous diffuser 50 that acts as a bubble chamber, as shown in FIGS. 2A-2B or, alternatively, through microporous diffuser 70 of FIGS. 3A-3B.

Figure 2A:
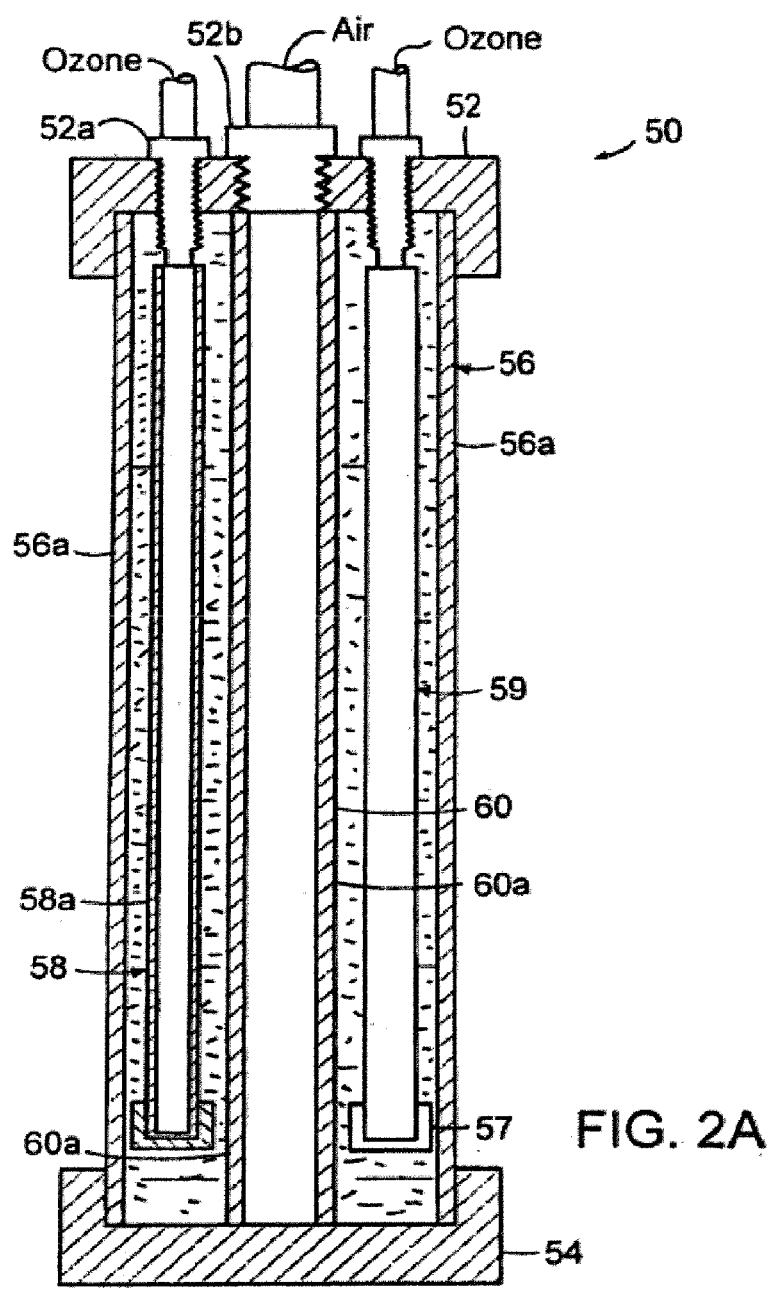
FIGS. 2A and 2B are longitudinal cross-section and lateral cross-sectional views of a microporous diffuser useful in the arrangement of FIG. 1.
Figure 2B:
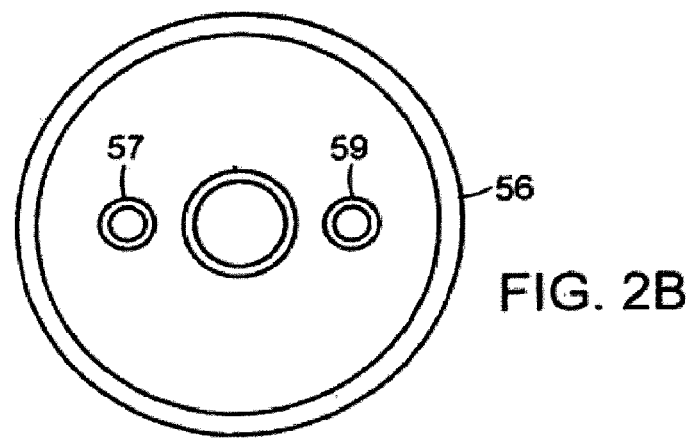

Referring now to FIGS. 2A-2B, microporous diffuser 50 includes a first cylindrical member 56 comprised of a hydrophobic material that provides an outer cylindrical shell for microporous diffuser 50. Cylindrical member 56 has a sidewall 56a comprised of a large plurality of micropores. A second cylindrical member 60 is coaxially disposed within first cylindrical member 56. Second cylindrical member 60 is comprised of a hydrophobic material and has a sidewall 60a comprised of a large plurality of micropores. Also disposed within the confines of first cylindrical member 56 are a plurality of cylindrical members 58, here four, which have sidewalls 58a having a large plurality of micropores and also comprised of a hydrophobic material.

Proximate ends of the plurality of cylindrical members 58 are coupled to first inlet ports generally denoted as 52a and a proximate end of central cylindrical member 60 is coupled to a second inlet port 52b which is provided with inlet cap. In the disclosed embodiment, ozone is fed to first inlet ports 52a and air is fed to second inlet port 52b. At the opposite end of microporous diffuser 50 an end cap 54 covers distal ends of cylindrical members 56 and 60. Here distal ends of the plurality of cylindrical members 58 are sealed by separate caps 57 but could be terminated by end cap 54. End cap 54 in conjunction with cap 52 seals the ends of microporous diffuser 50. Each of cylindrical members 56, 58 and 60 are here cylindrical in shape and have a plurality of microscopic openings constructed through sidewalls 56a, 58a and 60a, respectively, which have pore sizes matched to or create a pore size effective for inducing gas/gas reactions. Sidewalls of each of the cylindrical members can have a pore diameter in a range of 1-200 microns, preferably 1-80 microns and more preferably 1-20 microns. The combination of inlet cap 52 and end cap 54 seals microporous diffuser 50 permitting liquid and gas to escape by the porous construction of sidewalls of the microporous diffusers.

Microporous diffuser 50 can optionally be filled with a microporous material such as microbeads with mesh sizes from 20 to 200 mesh or sand pack or porous hydrophilic plastic to allow introducing ozone into the pore spaces where ozone is exiting.

Figure 3A:
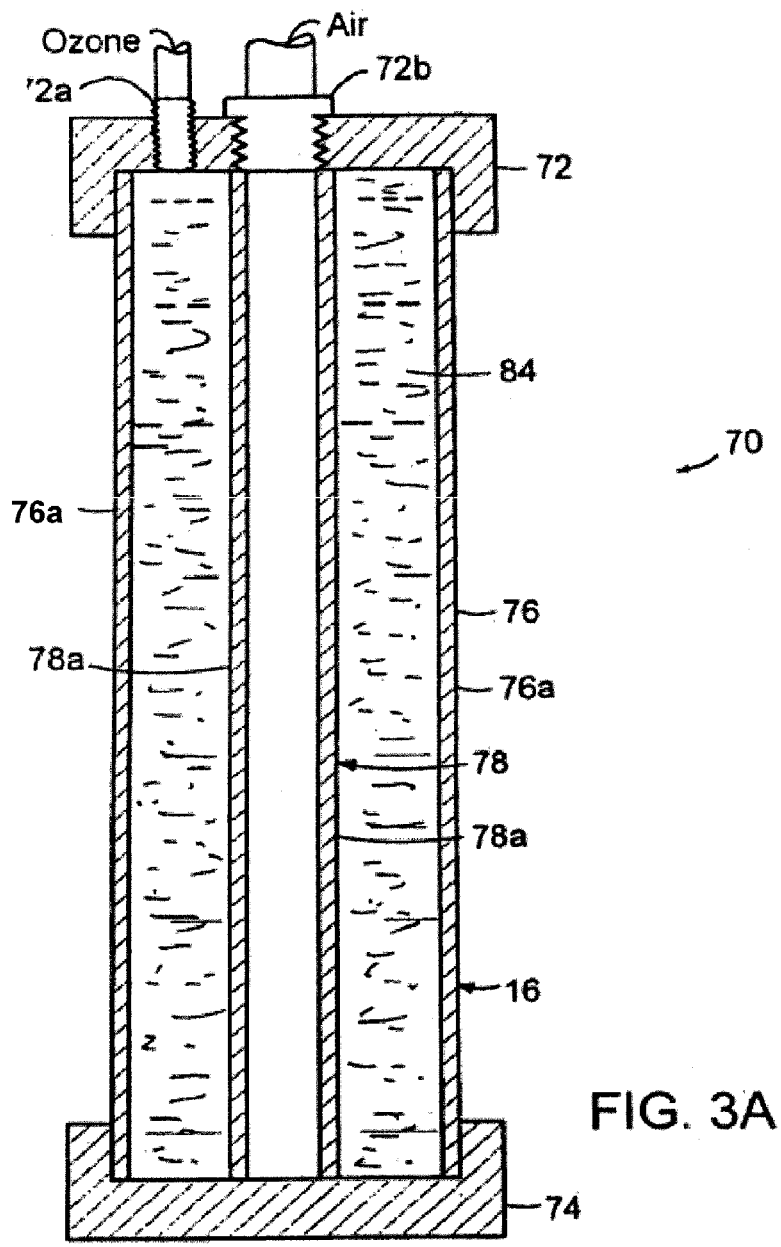
FIGS. 3A and 3B are longitudinal cross-section and lateral cross-sectional views, respectively, of an alternative microporous diffuser useful in the arrangement of FIG. 1.
Figure 3B:
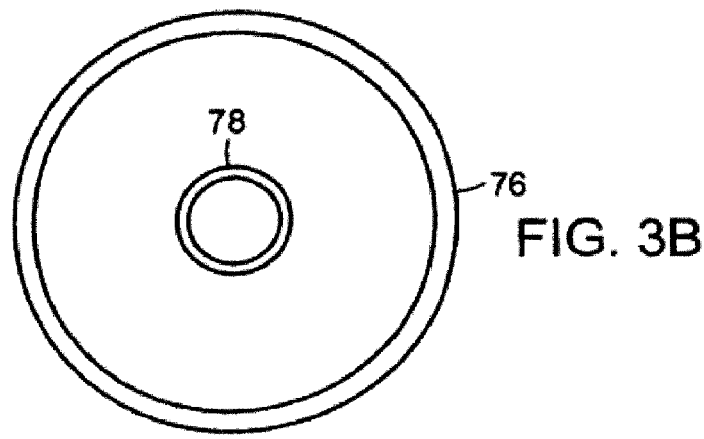

Referring now to FIGS. 3A and 3B, an alternate microporous diffuser 70 is shown. Microporous diffuser 70 includes an outer cylindrical member 76 having a sidewall 76a within which is disposed an inner cylindrical member 78 having a sidewall 78a. Inner cylindrical member 78 is spaced from the sidewall of the outer cylindrical member. The space between inner and outer cylindrical members 76, 78 is filled with a packing material comprised of glass beads or silica particles (silicon dioxide) or porous plastic which, in general, are hydrophilic in nature. This space is coupled to a first input port 72a which receives a first gas, e.g., ozone from pump 26.

Microporous diffuser 70 has inner cylindrical member 78 disposed coaxially or concentrically to cylindrical member 78. Sidewalls of each of the cylindrical members can have a pore diameter in a range of 1-200 microns, preferably 1-80 microns and more preferably 1-20 microns. A proximate end of inner cylindrical member 78 is coupled to a second inlet port 72b that is fed a second gas, e.g., air from pump 22. The microporous diffuser also includes an end cap 74 that secures distal ends of cylinders 76 and 78. The combination of inlet cap 72 and end cap 74 seals microporous diffuser 70 permitting liquid and gas to escape by the porous construction of sidewalls of the microporous diffusers.

Figure 4A:
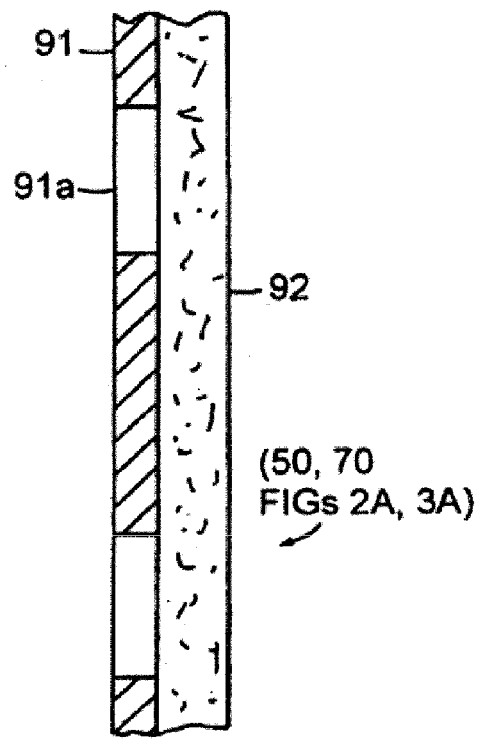
FIGS. 4A and 4B are cross-sectional views of sidewalls of the microporous diffusers of FIG. 2A, 2B or 3A, 3B showing exemplary construction details.
Figure 4B:
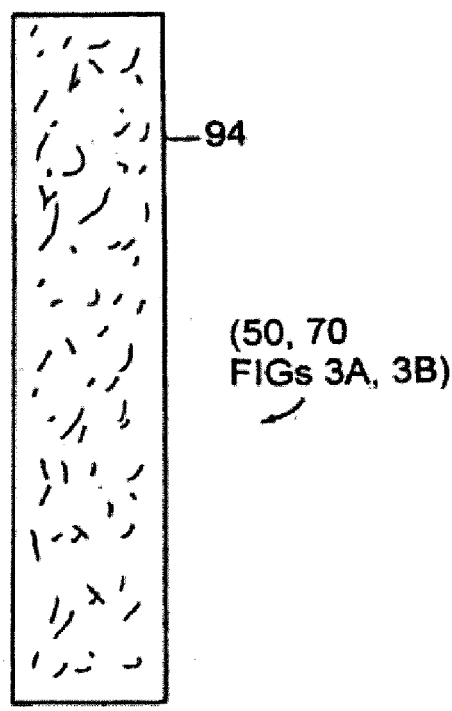

Referring now to FIGS. 4A, 4B, construction details for the elongated cylindrical members for microporous diffusers 50, 70 are shown. As shown in FIG. 4A, sidewalls of the members can be constructed from a metal or a plastic support layer 91 having large (as shown) or fine perforations 91a over which is disposed a layer 92 of sintered, i.e., heat fused, microscopic particles of plastic. The plastic can be any hydrophobic material such as polyvinylchloride, polypropylene, polyethylene, polytetrafluoroethylene, high-density polyethylene (HDPE) and alkylbenzylsulfonate (ABS). Support layer 91 can have fine or coarse openings and can be of other types of materials.

FIG. 4B shows an alternative arrangement 94 in which sidewalls of the members are formed of sintered, i.e., heat fused, microscopic particles of plastic. The plastic can be any hydrophobic material such as polyvinylchloride, polypropylene, polyethylene, polytetrafluoroethylene, high-density polyethylene (HDPE) and alkylbenzylsulfonate (ABS).

The fittings (i.e., the inlets in FIGS. 2A, 3A) can be threaded and are attached to the inlet cap members by epoxy, heat fusion, solvent or welding with heat treatment to remove volatile solvents or other approaches. Standard threading can use for example NPT (national pipe thread) or box thread, e.g., (F480). The fittings thus are securely attached to the microporous diffusers in a manner that insures that the microporous diffusers can handle pressures that are encountered with injection of the air/ozone.

Figure 5:
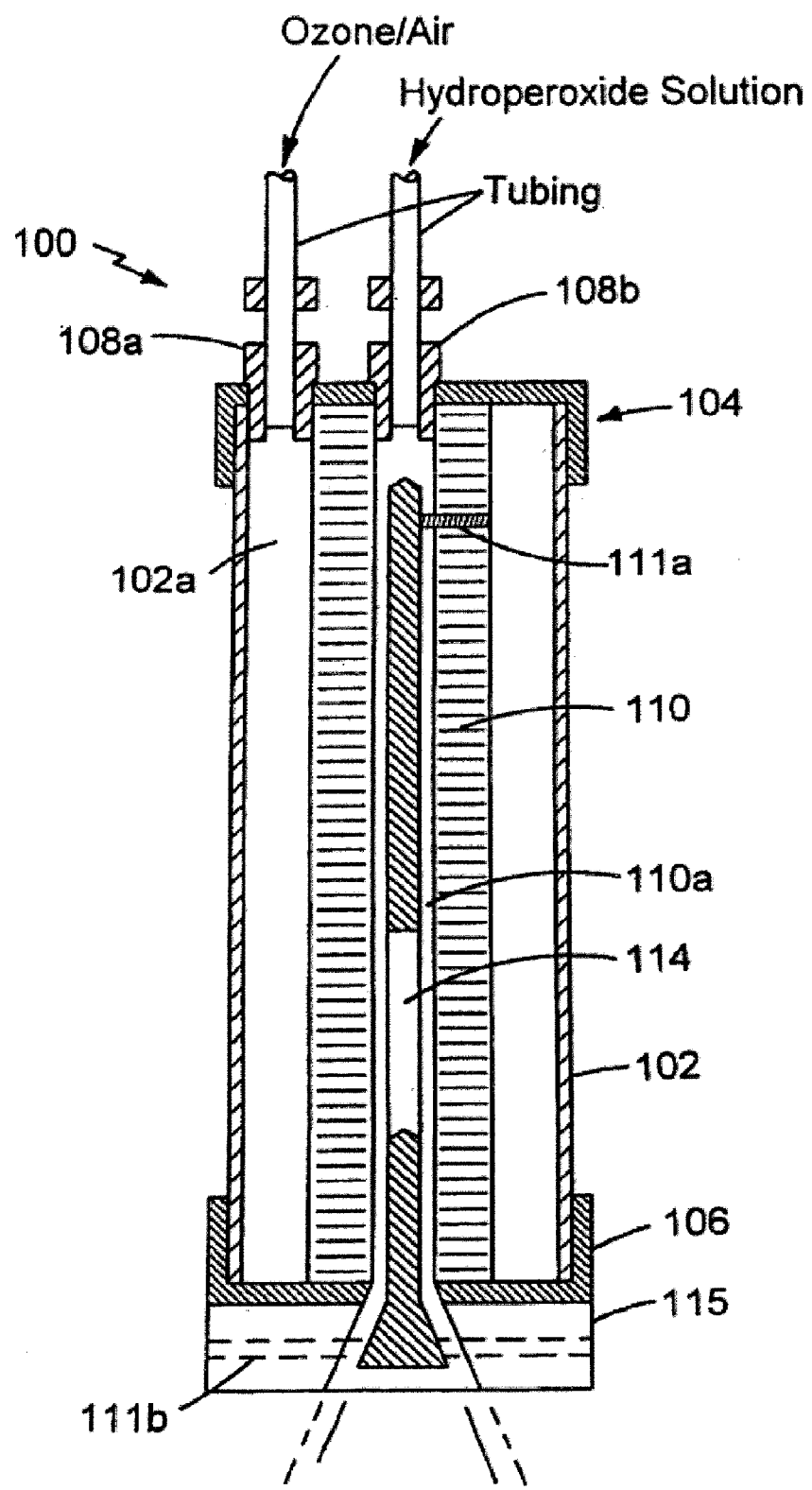
FIG. 5 is a cross-sectional view of a microbubbler useful in the arrangement of FIG. 1.

Referring to FIG. 5, an embodiment of a microbubbler 100 is shown. Microbubbler 100 includes an outer cylinder 102 that is secured between a top cap 104 and a bottom cap 106. In top cap 104, a pair of inlets 108a, 108b are disposed. Outer cylinder member 102 defines a first interior chamber 102a that is fed by inlet 108a. Microbubbler 100 also includes an inner cylinder 110 of a microporous material, which defines a second interior chamber 110a. A solid cylindrical insert 114 is disposed within an upper portion of the second interior chamber 110a and is secured in place by a pin 111a that is attached for instance to cylinder 110. A nozzle member 116 is disposed within a lower portion of second interior chamber 110a and is secured in place by a second pin 111b that is attached for instance to a shroud 115 that covers the bottom end cap.

Microbubbler 100 receives a liquid through inlet 108b that directly couples to a chamber defined by inner cylinder 110 and propagates through the region about the solid cylindrical insert 114. In some embodiments the liquid can be hydrogen peroxide whereas in others it can be clean water. In a water embodiment, the microbubbler can be used in a pumped water or recirculating water arrangement, where an external source of water or water found inside the well, e.g., in a fractured formation, is recirculated into microbubbler 100 using a submersible pump or other arrangement (not shown). Gas, ozone and air are fed through inlet 108a through the cavity or chamber defined by outer cylinder member 102 and inner cylinder 110 of the microporous material. Pressure of the gas forces the gas out of the cavity through the microporous materials (e.g., 2 to 200 microns) where the gas (ozone and air) meets the liquid, which forms bubbles of the gas with a coating of the liquid. The solid cylindrical insert 114 and nozzle 116 provide dispersion of the bubbles through the bottom end cap.

In a typical embodiment, tubes that connect to bubbler 100 can be stainless steel, the outer cylinder is PVC schedule 40, having an inner diameter of 2", the cylinder member 104 has a diameter of 1 inch, and an inner diameter of 0.5 inches, leaving a sidewall of microporous materials 0.25 inches thick.

Microbubbler 100 can be used in conjunction with one or more microporous diffusers 50, 70 in a sparging apparatus of FIG. 1 or a non-laminar microporous diffuser (e.g., one that delivers a single fluid stream), where the application is for a deep well. Alternatively, the microbubbler can be used in a shallower well, e.g., less that 180 ft in depth with or without one or more laminar microporous diffusers 50, 70, or a non-laminar microporous diffuser (e.g., one that delivers a single fluid stream). Alternatively, microbubbler 100 can be used in place of microporous diffusers. When disposed in a sparging apparatus, a packer (not shown) can be placed generally anywhere along the length of bubbler 100 provided it is above the shroud and below fittings for the tubing. Alternatively a seal may be substituted for the packer in an open borehole. Suitable materials for use as a seal include, but are not limited to, bentonite, elastomer or cement or combinations thereof, and may be designed to seal the open borehole.

Solid cylindrical insert 114 can have a taper starting at about 0.5 inches diameter to fit snuggly into the interior of second member 104 and taper down to 0.1 to 0.15 inches at the bottom. The length of microbubbler 100 can be of the order of 0.5 to 5 feet, more preferably 1-2 feet in length. The taper can allow manual adjustment of solid cylindrical insert 114 within the cavity of second member 104 to provide an adjustment of the shearing properties of the fluid as it passes over the inner surface of the microporous material and exits microbubbler 100.

By combining reactants below the surface this microbubbler 100 avoids quenching of reactants during transport and lessens side reactions that can take place with transport tubing and delivery systems. The bubble size of the bubbles can be adjusted by changing the size of the microporous materials and by adjusting the shearing velocities of the liquid that sheers bubbles away from the microporous materials. Also the distribution of the bubbles can be adjusted by pulsing of the gas/liquids.

Environmental Remediation Systems and Methods

Figure 6:
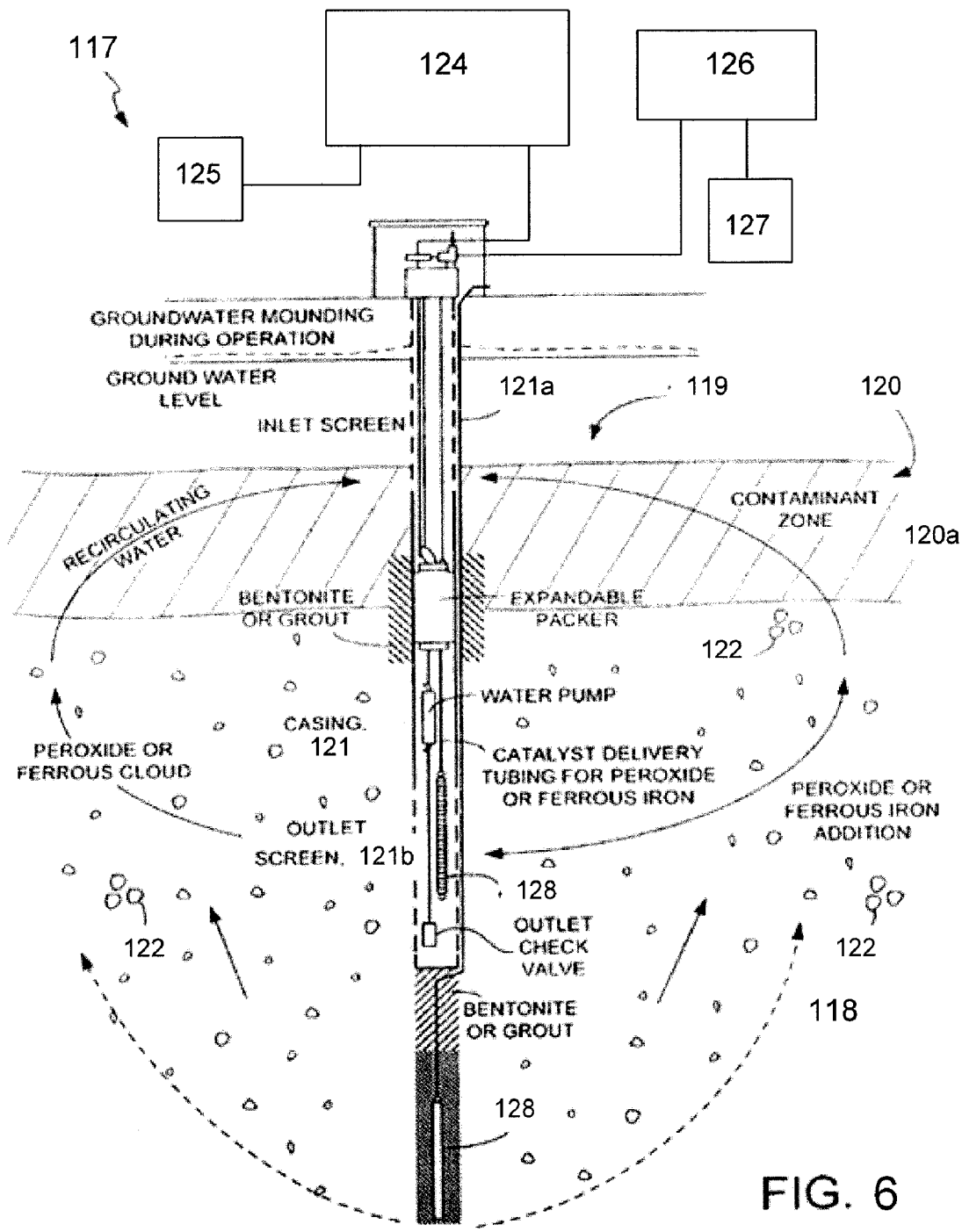
FIG. 6 illustrates an ozone introduction apparatus at a treatment site using a recirculation well.

Referring now to FIG. 6, a sparging arrangement 117 for use with plumes, sources, deposits or occurrences of contaminants in a vadose zone 120a or aquifer 120, is shown. Sparging arrangement 117 is disposed in a well 119 that has a casing 121 which can include an inlet screen 121a and includes an outlet screen 121b. With inlet and outlet screens 121a, 121b, a recirculation well is provided to promote recirculation of water through the surrounding ground/aquifer region 118. The casing 121 supports the ground about well 119. Disposed through casing 121 are one or more diffusers 128. Here, two diffusers 128 are shown. In one embodiment, microbubbles of air, air enriched with oxygen or air and ozone and/or oxygen are emitted into the surrounding formation. Other arrangements can include coated microbubbles discussed below. The arrangement of FIG. 6 can include a packer, but need not include a packer for certain configurations. Alternatively, diffusers that do not have a microporous surface can be used. A water pump and check valve can also be included in the well.

Sparging arrangement 117 also includes a compressor/pump and compressor/pump control mechanism 124 to feed a first fluid 125, e.g., a gas such as an ozone/air or oxygen enriched air mixture into diffuser 128. A second compressor/pump and compressor/pump control mechanism 126 is also coupled to a source 127 of a second fluid, e.g., a liquid, e.g., hydrogen peroxide or a peroxide, to feed a second fluid to some embodiments of diffuser 128, e.g., a multi-fluid diffuser 128. Catalysts can be delivered to microporous diffusers 128, via tubing. As illustrated in FIG. 6, lower diffuser 128 is embedded in Bentonite or grout. Ozonophilic bacteria 122 are introduced if suitable bacteria are not present or if the bacteria are not present in sufficient quantities.

Figure 7:
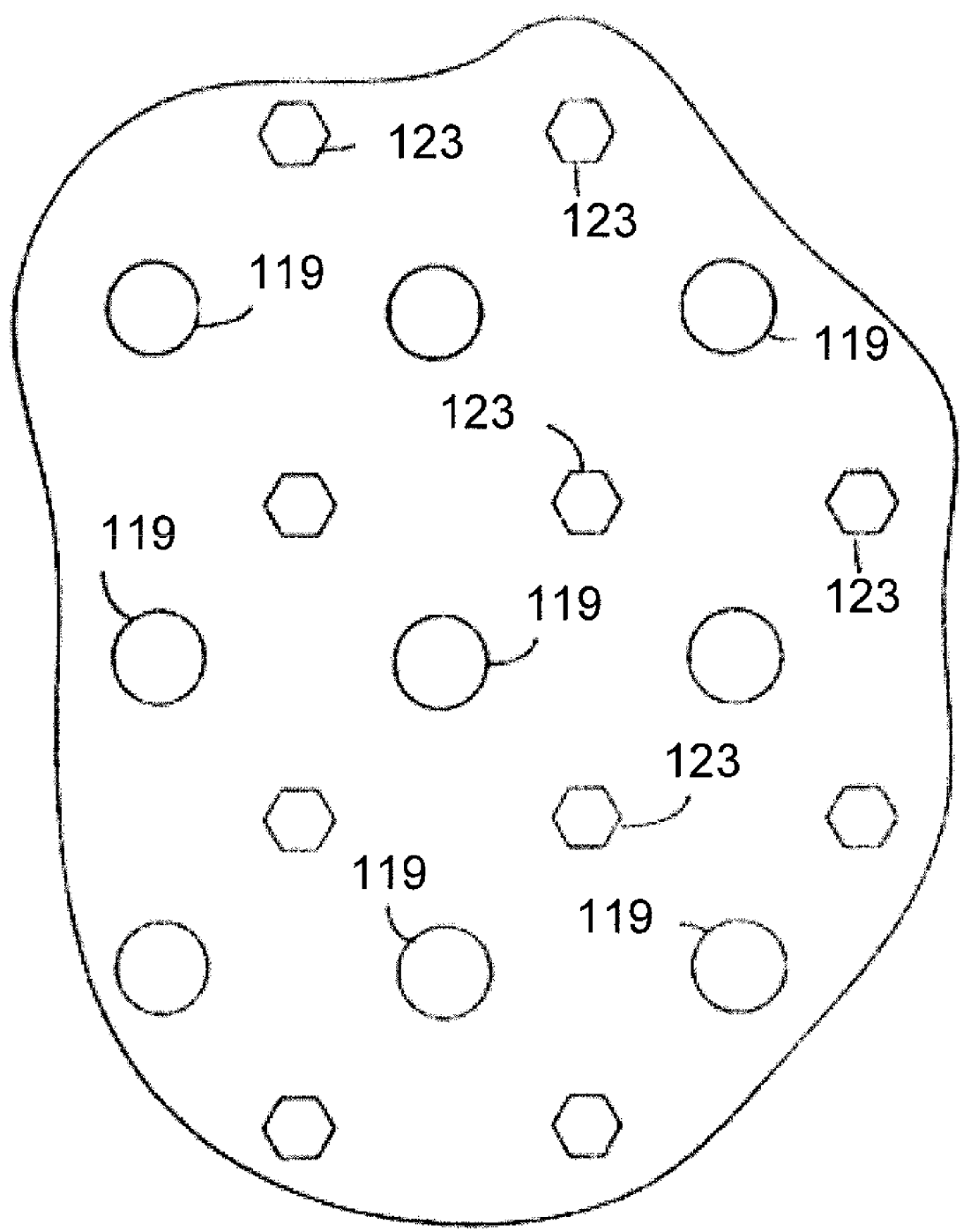
FIG. 7 is a diagram depicting a typical arrangement of wells with the apparatus in FIG. 1 and injection points for bacteria introduction.

Referring to FIG. 7, one of many possible arrangements to inject bacteria into a site is shown. Ozonophilic bacteria are introduced in several ways. One way to introduce the ozonophilic bacteria would be to inject bacteria through other wells or through injectable probes 123 that are spaced from wells 119 and arranged much as in a centered grid across the contaminated site, as shown. The injectable probes or minipoints, like those discussed in Brame (U.S. Pat. No. 4,310,057) or Kerfoot, Apparatus for and Method of Underground Fluid Sampling (U.S. Pat. No. 4,804,050), would be suitable. Other types of probes or minipoints could be used. Various spacing can be used. Ideally, the injectable probes are disposed between adjacent spargewells 119. Given typical spacings of such wells, a 15 foot spacing from a well is suitable.

Another way to introduce ozonophilic bacteria to a site would be to include the bacteria in the materials introduced with the microporous diffusers. However, this would necessitate turning off the ozone supply for a period until the bacteria could be introduced and dispersed, because at such levels of ozone, the bacteria generally would be destroyed.

Bacteria include any bacteria that are suitable for conversion of hydrocarbon moieties of chemical compounds (in whole or in part) to carbon dioxide and water, and possibly other products. In one aspect, the particularly useful bacteria are those that tolerate exposure to ozone or can thrive and multiply (e.g., by a factor of $\times 10^3$) (e.g., fast growers) on hexadecane. Bacteria suitable for the processes described herein include those of the genera: *Microbacterium*, *Gordonia* (2), *Hydrogenophaga*, *Nocardia*, *Rodococcus*, *Spingomonas*, *Xanthobacteria*, *Algallgenes* (2), *Mycobacteria*, *Rubrivivax*, *Arthrobacter*, *Acidovorax*, *Burkholderia*, *Variovarax*, or *Pseudomonas*.

*Microbacterium*, *Burkordiva*, *Pseudomonas* and *Xanthobacteria* are particularly useful. For example, certain *Pseudomonas* species have a characteristic that their cell walls are resistant to hydroxyl radicals because they secrete peroxidase (hydrogen peroxide and reaction with bond iron ferripyochelin).

When the oxidant is a gas, e.g., ozone, the gas can be provided from a tank (e.g., provided via compressed tanks), provided using a compressor, or generated on-site with a suitable generator. Particular apparatus for delivery of ozone/air to diffusers include, e.g., Model 5020 C-Sparger® System, Model 6000 Palletized C-Sparger Unit, KTI Model 8600 Wall Mount Perozone® System, KTI Model 8000 Series Palletized System; all available from Kerfoot Technologies, Inc., Mashpee, Mass. Other apparatus can be used.

The gas can be introduced by microbubble or other suitable application technique, using a diffuser or applicator or a microporous diffuser, including those noted above and in, e.g., U.S. Pat. No. 5,855,775; U.S. Pat. No. 6,083,407; U.S. Pat. No. 6,284,143. Ozone can also be introduced by use of ultraviolet (UV)-irradiating tubes in a treatment well, with the water flowing over the tubes to generate ozone. The UV-irradiating tubes are suspended centrally in a double-screened well with a packer/pump combination (e.g., a C-Sparge® ozone recirculation well). In this case, an air or oxygen pump would not be required. Alternatively, ozone can be introduced by use of pulsed discharge plasma in water (see, for example, Sate and Sugiarto, "Pulsed Discharge Plasma in Water—Chemical and Physical Properties" in Abstracts of the Eighth International Conference on Advanced Oxidation Technologies for Water and Air Remediation, Toronto, Canada, Nov. 17-21, 2002). High voltage and short duration pulsed voltage can form intense plasma in conducting waters. The discharge system uses needle-plate electrodes. In the streamer discharge mode, plasma channels are formed in the water, yielding ozone concentrations. No compressors (air or oxygen) would be necessary for generating ozone in solution. The ozone is generated by electrolysis. In both instances, a pump to move the water away from the ozone generator is necessary for circulation and dispersion.

The normal application of ozone to sites for soil and groundwater remediation involves placement (by angering or geoprobe direct push) of diffusers 128 (e.g., Spargepoint® diffusers) below the water table across the treatment site. Microporous diffusers 128 have a pore size varying from about less than 0.3 or up to 1 micron as a low value to 50 microns or up to 200 microns as a high value, a porosity of about 30 to 45 percent, and a low resistance to gas flow through the side walls (usually 1 psi or less per foot of length at flows of about 1 cfm per foot of length). The diffusers (e.g., Spargepoint® diffusers) are placed about 10 to 20 feet below the water table if the spill is light nonaqueous petroleum liquid (LNAPL). A fine sand (e.g., "sugar sand"; 60 mesh size) is placed around the diffuser placement points to assure formation of fine channels and bubbles in the aquifer. The gas is pulsed at a rate of about 5 to about 30 minute intervals to assist transport through the soil capillary pores.

Peroxide (e.g., hydrogen peroxide, organic hydroperoxides) may be introduced as a liquid into diffuser 128 (e.g., Laminar Spargepoint®, or individual Spargepoint®) or with a separate well screen in the vicinity of the ozone diffuser (e.g., Spargepoint®). In both cases, the ozone microbubbles become coated with the peroxide.

Normally, the arrays are placed horizontally across the site with 30% or greater overlap to achieve a more uniform distribution of oxidant at the site. The diffusers (e.g., Spargepoint®), when operated at about 3 to 5 cfm, normally will have a radius-of-influence (ROI) of 20-30 feet. Diffusers 128 can be placed in a staggered pattern vertically if the contaminated zone is broader than at the water table and within 10 feet below. Again, a 30% overlap vertically is desirable. Since vertical hydraulic conductivity is usually less than horizontal, a 40-foot contaminant zone would require at least two vertically separated points.

Normally, peroxide is supplied to the diffusers (e.g., Laminar Spargepoint®) at a mass and molar (or gram) ratio of the ozone (mass) content, depending upon the target organic compound and its mass distribution. In the event of use of two (or more) diffusers (e.g., Spargepoint®) or a diffuser (ozone) and well screen (hydrogen peroxide), the time sequence can be varied, usually injecting the hydrogen peroxide first and then following with ozone to assure contact of the ozone gas with the hydrogen peroxide. The diffusers are any diffuser capable of delivering the agents (e.g., ozone, hydrogen peroxide, hydroperoxides). For example, the range of diffusers available from Kerfoot Technologies, Inc., Mashpee, Mass. known as Spargepoint® Microporous Bubblers (e.g., Models SPT1272, SPT 1293, SPT 1292, SPT 1294, and the like) can be used. Sparging arrangement 117 can supply nutrients such as catalyst agents 42 including iron containing compounds such as iron silicates or palladium containing compounds such as palladized carbon. In addition, other materials such as platinum may also be used.

The gases useful in the microbubbles are any that are suitable for chemical or biological reaction and remediation. For example, in oxidative applications, ozone, oxygen and air are suitable gases. In reductive applications, nitrogen or hydrogen can be used. The gas suitable for an application is dependent, in part, on criteria such as the reaction desired, or the bacterial growth requirements (aerobic or anaerobic). The gas can be generated in-situ (e.g., ozone generator), provided using a compressor, or provided via compressed tanks.

Suitable microporous diffusers 128 are those having the ability to deliver a gas and a liquid such that microbubbles less than about 200 microns, preferably between about 0.3 and 200 microns, are produced including the gas therein, and in certain embodiments having a thin layer of the liquid material coating the microbubble. Diffuser 128 are constructed of a variety of materials suitable for the gases and liquids to be delivered. Suitable materials include, for example, stainless steel, high-density polyethylene (HDPE), low-density polyethylene (LDPE), polyvinyl chloride (PVC), polytetrafluoroethylene (PTFE, e.g., TEFLON), acetal (e.g., DELRIN), or polypropylene. Diffusers 128 can include concentric tubes of microporous material, optionally having additional packing materials (e.g., hydrophobic plastics, hydrophilic plastics, beads, interconnected fibers) sandwiched between the tubes to facilitate creation of the gas-liquid interface in the microbubble. These materials aid the liquid coating process of the gas flowing through the diffuser in the generation of microbubbles, in part by their hydrophilic or hydrophobic nature to enhance coating, and in part by their ability to increase the positioning of the liquid to optimize contact with the gas flowing through. Examples of diffusers suitable for use in the methods delineated herein include the laminar microporous SPARGEPOINT® diffuser or the C-SPARGER® diffuser (both available from Kerfoot Technologies, Inc., Mashpee, Mass.).

Aerosols or aerosolized liquid particles are one method by which coated microbubbles can be formed. The aerosolized particles are produced using an aerosolizer, including any apparatus suitable for providing an aerosolized form of a liquid (e.g., a commercial airbrush Badger 150). The aerosolized liquid particles can be any that are suitable for use in the coating application (i.e., chemical or biological reaction) and remediation process of interest, including for example, oxidants (e.g., hydrogen peroxide, organic hydroperoxides, potassium permanganate, Fenton's reagent (hydrogen peroxide and Fe(II))), catalysts (e.g., as delineated below), acids, (e.g., acetic, lactic), and nutrients (e.g., as delineated below).

The aerosol can be generated using an aerosol head including a reservoir of liquid or liquid and microfine particle mixture; a siphon tube made of e.g., TEFLON® or resistant flexible plastic; a tube supply with compressed air; a mixing chamber where the liquid is drawn into the flowing gas; a spray head which controls the particle size and distribution of the aerosols; and a compression fitting which directs the aerosol flow into the air/ozone gas stream. The mixing chamber can be, for example, a Bernoulli chamber, that is, any chamber that (in accordance with Bernoulli's principle) is capable of compressing a fluid through a narrower opening into a larger chamber resulting in a variance in pressure. The aerosol head can further include connecting tubing such as TEFLON® tubing $\frac{3}{8}$" to $\frac{1}{2}$" in diameter, polyvinyl chloride tubing $\frac{1}{2}$" to 1" in diameter, with o-ring seals (e.g., VITON) and threaded 5 ft. sections. The aerosol head is in communication with the microporous diffusers, in a manner to maintain a sufficient rate of gas flow to avoid condensing of the aerosol flow. The aerosol spray head can be adjustable to vary the liquid flow feed rate from between about $\frac{1}{10}$ to $\frac{1}{10,000}$ of the flow of the air/ozone volume flow. Also, the aerosol flow can be introduced continuously with the air/ozone flow.

In one embodiment of arrangement 117, the arrangement uses a microporous diffuser 128. The microporous diffuser can be comprised of sintered plastic, stainless steel, or ceramic and has a porosity characteristic that delivers microbubbles having a diameter of about 0.3 or less to 200 microns. Suitable microporous diffusers such as Kerfoot Technologies Spargepoints® can be used. The microbubbles include a source of oxygen, such as ozone/air, air, or oxygen enriched air. Other embodiments can use a two-port laminar diffuser or laminar multi-fluid diffuser 128. With the two-port laminar diffuser one of the inlets introduces a first gas stream within interior regions of the multi-fluid diffuser, a second introduces a fluid through porous materials in the laminar multi-fluid diffuser to coat bubbles that emanate from the interior of the laminar microporous diffuser. Suitable microporous diffusers such as Kerfoot Technologies Laminar Spargepoints® can be used.

In still other embodiments a laminar multi-fluid diffuser that allows introduction of multiple, fluid streams, with any combination of fluids as liquids or gases can be used. The laminar multi-fluid diffuser has one of the inlets that introduces a first gas stream within interior regions of the multi-fluid diffuser, a second inlet introduces a fluid through porous materials in the laminar multi-fluid diffuser, and a third inlet introduces a third fluid about the periphery of the laminar multi-fluid diffuser. The fluid streams can be the same materials or different. For example, the first fluid stream can be a gas such as an ozone/air mixture, the second fluid can be a liquid such as hydrogen peroxide, and the third fluid can be a liquid such as water. The outward flow of fluid, e.g., air/ozone from the first inlet results in the liquid, e.g., the hydrogen peroxide in the second flow to occur under a siphon condition developed by the flow of the air/ozone from the first inlet. Alternatively, the flows of fluid can be reversed such that, e.g., air/ozone from the second inlet and the liquid, e.g., the hydrogen peroxide flows from first inlet to have the ozone stream operate under a siphon condition, which can be used to advantage when the arrangement is used to treat deep deposits of contaminants. Having the ozone generator under a siphon condition is advantageous for operation of the ozone generator at optimal efficiency and delivery of optimal amounts of ozone into the well, especially if the ozone generator is a corona discharge type. In this embodiment, the third fluid flow is water. The water is introduced along the periphery of the multi-fluid diffuser via the third inlet.

Sparging arrangement 117 is disposed on sites of contamination, which are any location having at least one contaminant. The contaminant may be naturally occurring or introduced by human action. The site can be ground (e.g., soil, sand, dune, rock, gravel, sediment), or water (e.g., groundwater, aquifer, pool, river, lake, pond, marsh, wetland) or mixture thereof (e.g., riverbed, seabed, lakebed). The site can be natural (e.g., forest, river, lake, stream, beach, shoreline) or man-made (e.g., manufacturing site, storage site, or dispensing site). The site can be commercial or residential in nature. In particular, the site may be contaminated with toxic organic compounds. Thus petroleum wells or drill sites, sites having storage tanks (e.g., refineries, fueling stations, gas stations, transfer facilities), or sites where petroleum products are bought, sold, dispensed or disposed of (e.g., filling stations, automotive service shops, oil change or lubrication shops, boating service shops, airports and associated fueling facilities) are sites of contamination suitable for methods discussed herein.

By way of example, such contaminants can include volatile organic compounds; nonvolatile organic compounds; alkanes; alkenes; total petroleum hydrocarbons (TPH; includes alkanes, alkenes, aromatics, PAHs, BTEX, etc.); polyaromatic hydrocarbons (PAHs) (e.g., anthracene, fluoranthene, phenanthrene, naphthalene); polychlorinated biphenyls (PCBs) (e.g., arochlor 1016); chlorinated hydrocarbons (e.g., tetrachloroethene, cis- and trans-dichloroethene, vinyl chloride, 1,1,1-trichloroethane, 1,1-dichloroethane, 1,2-dichloroethane, methylene chloride, chloroform, etc.); methyl tertiary-butyl ether (MTBE); and BTEX (e.g., benzene, toluene, ethylbenzene, xylenes, and the like); explosive residues (e.g., nitrobenzenes, RDX, trinitrotoluene (TNT), etc.); and chlorinated pesticides (e.g., chlordane, heptachlor, etc.). The chemicals (e.g., oxidants), microbubbles, apparatus, biologics (e.g., bacteria), and methods herein are useful in remediating contaminants, including any one or combination of those delineated herein.

Oxidants, or oxidizing agents, are any chemical that is suitable for inducing another chemical compound to be oxidized when the two chemical entities are introduced to one another. Examples of oxidizing agents include ozone, hydrogen peroxide, organic hydroperoxides, oxygen, air, and the like, or combinations thereof. The oxidizing agents can be in any suitable delivery form, including gas, liquid, or combination thereof (e.g., hydrogen peroxide coated-microbubble having ozone therein).

Figure 8:
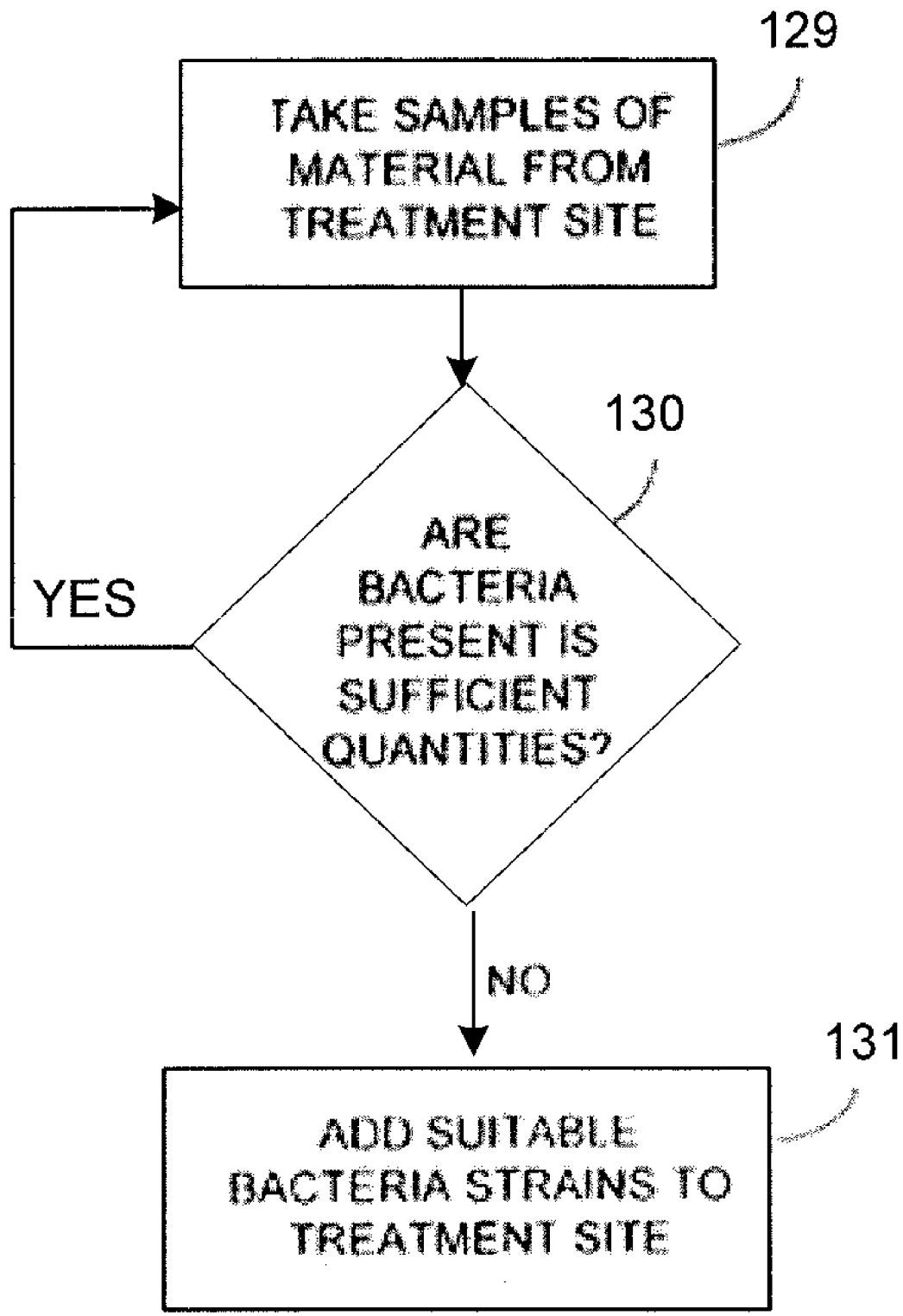
FIG. 8 is a flow chart depicting a treatment flow.

Referring to FIG. 8, samples of the contamination site (either before treatment is initiated, periodically during the treatment process, or after completion of the treatment process) are taken 129 for the determination of the presence of one or more bacteria and the levels of bacteria present. The samples are withdrawn from the site, using conventional techniques and are assessed 130 for the presence of suitable strains of bacteria useful in promoting destruction of contaminants present in the site. If assessment of the samples indicates an absence of or an insufficient quantity of the suitable bacteria strains, then a quantity of the suitable bacteria stains are introduced 131.

During treatment of the site, oxidants or oxidizing agents are introduced via diffusers. The presence of oxidants induces chemical reactions and promotes biological reactions by rapidly multiplying suitable bacteria strains that decompose the contaminants.

Certain organic compounds are subject to oxidative or reductive chemical degradation, resulting in lower molecular weight fragments or by-products. These by-products may be involved in bacterial metabolism such that they are "consumed" by the bacteria and undergo a biological reaction or degradation. In other instances, the processes provide nutrients (e.g., oxygen, nitrogen, carbon, phosphorous, potassium) such that bacterial growth, support, or proliferations occur upon consumption of the nutrients. These are also considered biological reactions. Further, certain processes delineated herein using oxidative chemical reaction conditions, such as ozone or ozone/hydrogen peroxide combinations, result in oxygen as a by-product (e.g., reduction of ozone to oxygen), which can act as feed for certain indigenous bacteria in the remediation area. Such enhancement of biological function, or bioremediation, is also considered within the scope of biological reactions.

The basic microbial process of biodegradation (aerobic) can be portrayed as a conversion of oxygen ($O_2$) to $CO_2$ and water plus more bacteria:

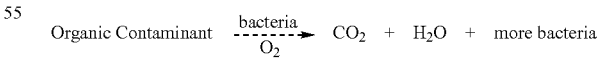

Whereas the conversion of oxygen ($O_2$) to $CO_2$ and water plus more bacteria may proceed rapidly in vat or surface vessels, maintaining an efficient and continuous degradation is more difficult in porous soils and open areas. Often evidence of natural biodegradation is shown by excess $CO_2$ in the overlying unsaturated soil zone (vadose zone) and low oxygen content in the saturated (aqueous) zone. The depletion of natural electron acceptors ($O_2$, $NO_3$, $SO_4$, Fe (III)), the depletion of natural electron donors (organic acids, e.g., acetate, lactate, $H_2$), the buildup of anaerobic metabolism gases such as $CO_2$, and the depletion of mineral nutrients ($NH_3$, $NO_3$, $PO_4$, K) regulate the rate of biodegradation.

An analysis of the volatile organic compound to be remediated takes into consideration the compound(s) Henry's Constant value (see, Tables 1 and 2), which is an indicator of the compound(s) proclivity to move from the liquid to the gaseous phase at an interface.

The newly observed microbial ozonophilic (i.e., ozone using bacteria) process can be viewed as:

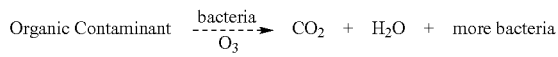

$$\text{Organic Contaminant} \xrightarrow[O_3]{\text{bacteria}} CO_2 + H_2O + \text{more bacteria}$$

TABLE 1

| HENRY'S CONSTANTS FOR CERTAIN COMPOUNDS | |
|---|---|
| High Henry's Constants (>$10^{-5}$) | Henry's Law Constant (atm-$m^3$/mole) |
| Benzene | $5.6 \times 10^{-3}$ |
| Benzo(a) pyrene | $1.1 \times 10^{-4}$ |
| Benzo(b) fluoranthene | $1.1 \times 10^{-4}$ |
| Bromodichloromethane | $1.6 \times 10^{-3}$ |
| Bromoform | $5.5 \times 10^{-4}$ |
| Bromomethane | $6.2 \times 10^{-3}$ |
| Carbofuran | $9.2 \times 10^{-5}$ |
| Carbon Tetrachloride | $3.0 \times 10^{-2}$ |
| Carbon Disulfide | $3.0 \times 10^{-2}$ |
| Chlordane | $4.9 \times 10^{-5}$ |
| Chloroethane | $6.2 \times 10^{-4}$ |
| Chloroform | $2.7 \times 10^{-3}$ |
| Chloromethane | $8.8 \times 10^{-3}$ |
| Chrysene | $9.5 \times 10^{-5}$ |
| 1,2 Dibromoethane (EDB) | $6.7 \times 10^{-4}$ |
| Dibromochloromethane | $8.7 \times 10^{-4}$ |
| 1,2-Dibromo-3-chloropropane | $1.5 \times 10^{-4}$ |
| 1,2-Dichlorobenzene | $1.9 \times 10^{-3}$ |
| 1,3-Dichlorobenzene | $3.3 \times 10^{-3}$ |
| 1,4-Dichlorobenzene | $2.4 \times 10^{-3}$ |
| Dichlorodifluoromethane | $3.4 \times 10^{-3}$ |
| 1,1-Dichloroethane | $5.6 \times 10^{-3}$ |
| 1,2-Dichloroethane | $9.8 \times 10^{-4}$ |
| 1,2-Dichloroethylene (cis) | $4.1 \times 10^{-3}$ |
| 1,2-Dichloroethylene (trans) | $9.4 \times 10^{-3}$ |
| 1,1-Dichloroethylene | $2.6 \times 10^{-2}$ |
| 1,2-Dichloropropane | $2.8 \times 10^{-3}$ |
| 1,3-Dichloropropene | $1.8 \times 10^{-2}$ |
| Dioxins | 5.6 x 10−3 |
| Ethyl Benzene | $8.4 \times 10^{-3}$ |
| Fluorene | $1.0 \times 10^{-4}$ |
| Fluorotrichloromethane | $9.7 \times 10^{-2}$ |
| (freon 11) | $1.1 \times 10^{-3}$ |
| Heptachlor | $3.2 \times 10^{-5}$ |
| Heptachlor epoxide | $1.3 \times 10^{-3}$ |
| Hexachlorobenzene | $1.4 \times 10^{-5}$ |
| Lindane | $1.6 \times 10^{-5}$ |
| Methoxychlor | $1.4 \times 10^{-4}$ |
| Methyl isobutyl ketane | $2.7 \times 10^{-5}$ |
| Methyl ethyl ketone (MEK) | |
| Methylene chloride | $2.0 \times 10^{-3}$ |
| Monochlorobenzene | $3.8 \times 10^{-3}$ |
| n-Hexane | $1.4 \times 10^{-2}$ |
| Napththalene | $4.8 \times 10^{-4}$ |
| Polychlorinated biphenyls | $1.1 \times 10^{-3}$ |
| Pyrene | $1.1 \times 10^{-5}$ |
| Styrene | $2.8 \times 10^{-3}$ |
| 1,1,1,2-Tetrachloroethane | $2.4 \times 10^{-3}$ |
| 1,1,2,2-Tetrachloroethane | $4.6 \times 10^{-4}$ |
| Tetrachloroethylene | $1.8 \times 10^{-4}$ |
| Toluene | $6.6 \times 10^{-3}$ |
| 1,2,4-Trichlorobenzene | $1.4 \times 10^{-3}$ |
| 1,1,1-Trichloroethane | $1.7 \times 10^{-2}$ |
| 1,2,3-Trichloropropane | $3.4 \times 10^{-4}$ |

TABLE 1-continued

| HENRY'S CONSTANTS FOR CERTAIN COMPOUNDS | |
|---|---|
| High Henry's Constants (>$10^{-5}$) | Henry's Law Constant (atm-$m^3$/mole) |
| Trichloroethylene | $1.0 \times 10^{-2}$ |
| Trifluralin | $2.6 \times 10^{-5}$ |
| 1,2,4-Trimethylbenzene | $5.6 \times 10^{-3}$ |
| Vinyl chloride | $2.7 \times 10^{-2}$ |
| Xylene (mixed o-, m-, and p-) | $7.0 \times 10^{-3}$ |

TABLE 2

| MODERATE HENRY'S CONSTANTS BUT BREAKDOWN PRODUCTS | |
|---|---|
| With High Henry's Constants | Henry's Constant |
| Dibutyl phthalate | $1.8 \times 10^{-6}$ |
| 2,4-Dichiorophenoxyacetic acid | $1.0 \times 10^{-8}$ |
| Di(2-ethylhexyl) phthalate | $3.6 \times 10^{-7}$ |
| 2,4-Dinitrotoluene | $1.3 \times 10^{-7}$ |
| 2,6-Dinitrotoluene | $7.5 \times 10^{-7}$ |
| Dinoseb | $4.6 \times 10^{-7}$ |
| Endrin | $7.5 \times 10^{-6}$ |
| Fluoranthrene | $6.5 \times 10^{-6}$ |
| Pentachlorophenol | $2.4 \times 10^{-6}$ |
| Phenol | $3.3 \times 10^{-7}$ |
| Pyridine | $8.9 \times 10^{-6}$ |
| Toxaphene | $6.6 \times 10^{-6}$ |

The rate of biodegradation in natural formations is very slow compared to above-ground. Further, the ability to mix gases, electron donors, or nutrients with organic contaminants is limited by the porosity and hydraulic conductivity of saturated soils. Porous soils tend to encourage movement of liquids as slugs, not easily mixing with existing groundwater. The rate of natural movement is slow and determined by existing groundwater gradients. Velocities of natural flows commonly run 0.1 to 2 ft/day. The natural flow across a 100 ft wide contaminant zone may take 50 to 1000 days. The capability to remove product waste products is similarly hindered.

To address these issues, an efficient technique to provide reaction promoters and simultaneously to remove unnecessary products is desirable. "Food," for the bacteria, in the form of carbon sources which provide energy (electron donors) is available in liquid form. Nutrients also can be mixed with "food" forms to assure ready availability of all required components for remediation conditions and organism growth enhancing environments. The presence of both as a coating to oxygen-enriched air provides bacteria with a very mobile nutrient system. In addition, gaseous products such as $CO_2$ can be transported away (i.e., displaced from the remediation area) as the gas rises. Microbubble (or similarly, nanobubble) technology thus provides an alternate technique for oxidant delivery having attributes to meet these needs.

A microbubble can be "coated" by forcing microbubbles from less than about 200 microns, e.g., 0.5 to 200 micron size through a porous liquid stream in a diffuser, (e.g., a "laminated" Microporous Spargepoint® diffuser (Model Nos. SPT2000 and SPT2010), available from Kerfoot Technologies, Inc., Mashpee, Mass.) or by introducing aerosolized liquid particles into the gas stream supplying a diffuser.

While not being bound by theory, generally, coatings made by forcing the microbubble through the liquid stream result in relatively thicker coatings caused, in part, by the thicker reaction points of the liquid forced through the gaseous phase in the diffuser. Conversely, those generated by the aerosol method result in microbubbles with relatively thinner coatings caused, in part, by the finer porous points of the liquid when introduced as an aerosol. Thicker coatings generally elevate the reactivity of the microbubble, particularly in oxidative reactivity. For example, thicker coatings of oxidative material are associated with increased Criegee oxidative capacity or oxidative potential (see, Dowideit and Sonntag, Environ. Sci. Technol. 1998, 32, 112-1119, incorporated by reference in its entirety), that is, the ability of the microbubble to break bonds of the chemical compound or contaminant subject to oxidative degradation. The thickness of a coating is ascertained by techniques such as microscopic capillary analysis of the microbubbles with dyes (e.g., India ink), back-lighting, or photoelectric cell detection methods.

The microbubbles can include a thin-layer coating having a material suitable for oxidative reactivity. So called, "high oxidative capacity" or "advanced oxidative" systems (e.g., using potassium or sodium permanganate, ozone in high concentrations, Fenton's reagent) are capable of particularly efficient chemical reactivity (e.g., bond breaking capacity, carbon-containing compound reactivity) useful in contaminant degradation processes. These reactions are characterized in that they have oxidation potentials in excess of 2.0 volts (based on electrochemical reactions at 25° C.).

Depending on the size and thickness of the microbubbles, different reactivity profiles can be achieved. Additionally, the composition of the gas in the bubble, as well as the type of liquid coating, is chosen to accomplish various oxidative or reductive degradation profiles, and catalysts (e.g., metals in microparticle form, acids) can be incorporated into the microbubble to increase reactivity and degradation efficiency of the microbubble. Moreover, the methods of generating microbubbles allow for control of the stoichiometry of the chemical components in the microbubble, again allowing for the ability to tailor the microbubble to a specific profile for a desired application or reactivity. By increasing the flow of liquid during the flow of gas, the thickness of the coating can be increased. The strength of oxidation capacity can be affected by increasing the concentration of hydrogen peroxide in the liquid phase as well as increasing the ozone content in the gas phase.

The size of the microbubble can be varied by controlling the pressure of the gas during generation of the microbubble and by choice of the diffuser pore size. For example, by generating smaller coated microbubbles, the surface to volume ratio increases, which improves reactivity of the microbubble. Additionally, in instances where a coating thickness is held constant, a smaller coated microbubble effectively has a "thicker" coating relative to a larger coated microbubble, thus resulting in a coated microbubble with a "thicker" coating and greater surface area (relative to volume), which both contribute to increased reactivity (e.g., in oxidative coating applications, higher oxidative potential). Normally, the range of fluid to gas varies from parity (1:1) to about 1:100. This corresponds to a coating thickness of 0.3 (30%) increase in radius down to 0.01 (1%). Table 3 illustrates the relationship between gas and liquid volumes and variance in the coating thickness.

TABLE 3

RELATIONSHIP OF MICROBUBBLE GAS VOLUME TO LIQUID VOLUME WITH CHANGE IN COATING THICKNESS MICROBUBBLE SIZE (MM)

| | Radius | | | |
|---|---|---|---|---|
| | 1.0 mm | .10 mm | .01 mm | .001 mm |
| | Diameter | | | |
| | (2000 micron) | (200 micron) | (20 micron) | (2 micron) |
| | Gas Volume | | | |
| | 4.189 mm$^3$ | 00419 mm$^3$ | 00000419 mm$^3$ | 00000000419 mm$^3$ |
| | Liquid Volume (1 m$^3$/day) (tenths of radius) | | | |
| .05 | 660 mm$^3$ (.157 m$^3$/day) | 0.00066 mm$^3$ | 0.00000066 mm$^3$ | 0.0000000066 mm$^3$ |
| .10 | 1.387 mm$^3$ (.33 m$^3$/day) | .00138 mm$^3$ | .00000138 mm$^3$ | .00000000138 mm$^3$ |
| .20 | 3.049 mm$^3$ (.73 m$^3$/day) | .00305 mm$^3$ | .00000305 mm$^3$ | .00000000305 mm$^3$ |
| Surface Area | 12.57 mm$^2$ | .1257 mm$^2$ | .001257 mm$^2$ | .00001257 mm$^2$ |
| Surface-to-Volume Ratio | 3 | 30 | 300 | 3000 |

The diameter of the microbubbles is selected according to a controlled size using a layered fine bubble production chamber. The layered fine bubble production chamber is a chamber in which a liquid is placed under pressure and microbubbles are generated. That is, over a period of time, an environment is provided where the microbubbles segregate by size (e.g., larger microbubbles rise and smaller microbubbles remain) thus allowing a mixture predominated by a particular microbubble size (or size range) to be established prior to injection into the treatment area. This is suitable for use, for example, where smaller microbubbles may be desired (i.e., for their higher surface to volume ratio).

One example of such control relates to the "Law of the Minimum", which states that bacterial growth will stop when the nutrient that was present in the lowest concentration (relative to the requirement) is exhausted, which becomes a problem since the rest of the mixture is useless. If that substance is replenished, growth will stop when the next substance is exhausted. By providing a technique for ready mixing of the constituents and having the capacity to modify the electron accelerator and nutrient ratios, using metabolic products as a guide (e.g., monitoring by-products formation in real time by sampling via a monitoring well and analyzing the samples using, for example, gas chromatography or other suitable analytical technique), the rate of metabolism can be adjusted and maximized.

Microbubbles form a unique physical and chemical environment which can effectively treat waterborne or attached (adsorbed) volatile organic compounds (VOCs). Diffusers, or spargers, placed in groundwater or saturated soil provide extremely small "microbubbles" with a very high surface area to volume ratio. This high surface area to volume ratio maximizes the VOC transfer from the liquid phase to gas phase. If the air bubbles are filled with an oxidizing gas, like ozone, the VOCs react with the ozone and are destroyed while still in the water column. This "in-situ"-combined VOC recovery and destruction not only obviates the need for an additional process step but also enhances the physical and chemical kinetics of the process.

Catalysts are any material useful in catalyzing the desired chemical transformation or process to promote a quicker or more efficient reaction. The catalysts are presented as micron-sized particles to augment the interface region of the microbubble. For example, transition metals including palladium (Pd), manganese (Mn), and iron (Fe), in elemental or salt forms; sulfur compounds including sulfates and sulfides.

Additionally, the acidity of reaction processes can be adjusted to enhance reactivity, and therefore the remediation processes described herein. For chemical reactions (i.e., remediation processes) that are more effective under lower pH conditions (i.e., acidic, pH less than 7) the microbubbles can be coated with an acidic coating, thus, lowering the pH of the interface and increasing the reaction rate and efficiency of the remediation process. Acid can also be incorporated in a coating having other liquids in it where beneficial chemical effects (e.g., increased reactivity, efficiency) can be realized For example, acid and iron (II or III) salts (e.g., Fenton's reagent), which in combination can catalyze the oxidative reactivity of the coated microbubble, may be used. This is advantageous in soil aquifers, where it is impractical to acidify the entire aquifer, and is also useful in reactions and remediation processes involving halocarbon contaminants.

Nutrient coatings on the microbubbles are any suitable nutrient for bacterial (aerobic or anaerobic) growth. Such nutrients include, for example, carbon sources (e.g., carbohydrates, sugars, beer, milk products, methanogens, organic acids such as acetic and lactic acids, organic esters such as acetates, propionates, organic ketones such as acetone), nitrogen sources (e.g., ammonia, nitrates, ammonium nitrate), phosphorous sources (e.g., soluble phosphates, etc), and potassium sources (e.g., 10,000 ppm of lactate; 680 ppm $NH_4NO_3$; 200 ppm $KH_2PO_4$ to provide sources of carbon and nitrogen, and phosphorus and potassium). Generally, environments suitable for bacterial support and growth are made up of nutrients in the following relative ratios: carbon (ca. 1000 parts), nitrogen (ca. 150 parts), phosphorous (ca. 30 parts), sulfur, potassium, and sodium (ca. 10 parts each), calcium, magnesium, and chloride (ca. 5 parts each), iron (ca. 2 parts), and any remainder elements in trace amounts, with the ratios based on molar equivalents, which may be in the form of either elemental or ionic (i.e., salt) forms, or a combination thereof.

In-situ stimulation of bacteria will not only cause increased contaminant biodegradation, but will also cause permeability decreases in porous media (Kalish et al. "The Effect of Bacteria on Sandstone Permeability", J. of Pet. Technol., 16:805 (1964); Shaw et al. "Bacterial Fouling in a Model Core System", Appl. Environ, Microbil., 49(3): 693-701 (1965)). Particularly around injection well screens, biofilm clogging presents a persistent headache to operators. The injection of oxygen, glucose, carbon sources and nutrients (e.g., $KH_2PO_4$, $NO_3$, etc.) promote bacterial growth. When colony-forming bacterial units per gram of soil (cfu/gm) exceed 100,000 units, permeability ($K_1/K_{base}$) can be reduced by half. Brough et al. ("Active Biofilm Barriers for Waste Containment and Bioremediation: Laboratory Assessment", in Vol. 4, In-situ and On Site Remediation, Battelle Press, Columbus, Ohio (1997)) has demonstrated that sodium hypochlorite (a common bactericide) can restore permeability by reducing cfu/gm levels. The biocide would have to be fed periodically or adjusted to limit cell growth to that where flow was maintained.

To address this situation, injection strategies can be used to modulate growth in a manner that does not adversely impact permeability. These strategies aid in avoiding plugging of the diffusers (e.g., Spargepoint®) because the ozone levels within close proximity of the diffuser are of a bactericidal concentration (thus killing bacteria and avoiding bacterial build-up near the diffuser) while at a further proximity, the ozone levels are conducive to proliferation of ozonophilic bacteria. Such strategies include, for example:

1. Intermittent Pulsing—periodic pulsing (e.g., 15 min.; 30 min; 1 hour intervals) with concentrations of oxidant adjusted to maintain a bactericidal zone within about 3 feet (ca. 1 meter) of the (e.g., Spargepoint® location) yet also maintain a 1 to 200 ppmv range across the 20-30 foot (ca. 10 meter) radius of influence (ROI) of the ozone to assist ozonophilic species;

2. Inject with Periodic High Dosages of Ozone—injection of high dosages of ozone (e.g., 300 to 1000 ppmv), but injected in intervals such that in between each injection a period of time is introduced such that enough time is allowed (e.g., 2-3 days) for recovery of the bacteria population (i.e., growth, proliferation) between "slugs" of oxidant introduction to allow "rebound" or reestablishment of ozonophilic bacterial populations.

Bacterial populations at the site are identified and the remediation technique is tailored to optimize the levels of the bacterial populations at the site to effect remediation of toxic organic compounds. Tailoring of the remediation can be used to optimize digestion rates of the bacterial populations at the site. The introduction of oxidant (e.g., ozone, ozone/$H_2O_2$) can optimize bacterial proliferation and/or bacterial activity at the site, while causing gas/liquid thin-layer microbubble oxidation to predigest and sterilize areas around injection locations. Nutrients and food source can be simultaneously injected with gas in proportion to an optimal ratio for assimilation. The nutrients can be injected to provide a coating (thin layer) over the gas (oxygen-enriched air) injected into porous soil capillaries.

Advantages of the techniques include: 1) modulation of the treatment site (e.g., local surroundings, clean-up site, contaminated site) to an environment where ozonophilic bacteria are more amenable to thrive (e.g., proliferate, metabolize toxic organic compounds (e.g., those delineated herein); 2) oxidation of carbon compounds (e.g., aliphatics, aromatics, toxic organic compounds, etc.) thereby creating substrates (e.g., oxygenated forms of carbon compounds, alcohols, ethers, aldehydes, ketones, esters, carboxylic acids, etc.) that are more easily processed (e.g., metabolized, digested, fragmented) by the bacteria, which can result in increases in the toxic compound/contaminant degradation rate, as well as increased proliferation of particular bacterial populations; 3) supplementing and/or enhancing the bacterial population (including any bacteria of the specific genera delineated herein) at the treatment site; 4) creation of an environment at the treatment site, which encourages bacteria capable of degrading (e.g., metabolizing, fragmenting, removing, remediating) carbon compounds to flourish.

In order that the techniques may be more readily understood, the following examples are set forth. It should be understood that these examples are for illustrative purposes only and are not to be construed as limiting in any manner. All references cited herein are expressly incorporated by reference in their entirety.

EXAMPLES

Screening Protocols

Example 1

Identification of Ozonophilic (Ozone-Loving) Hexadecane Degrading Bacteria

Bench scale tests were conducted on groundwater collected from a monitoring well. The groundwater was suspected to contain dissolved petroleum components from a former fuel oil release at the property. Samples were obtained from the site and tested within 6 hours of collection. The tests included treating five (5) groundwater samples with a combination of micro-sparged gases and hydrogen peroxide. A batch of five (5) tests were run on the samples and included the following parameters:

TABLE 4

BATCH TEST PARAMETERS TABLE

| Sample Name | Gas Flow Rate (1 pm) | Ozone Conc. (ppmV) (2) | Peroxide Flow Rate (mL/min) (3) | End of Test Groundwater Sample Name |
|---|---|---|---|---|
| Background (1) | NA | NA | NA | B1 |
| Test 1 | 0.8 | NA | NA | A |
| Test 2 | 0.8 | 100 | NA | AO100 |
| Test 3 | 0.8 | 300 | NA | AO300 |
| Test 4 | 0.8 | 300 | | AOP300 |
| Test 5 | 0.8 | 10 | NA | AO10 |

NOTES:
(1) = Subsample of collected groundwater from well MW-7
(2) = Measured using "Kitagawa" Type SB ozone detector tubes
(3) = 9% solution of hydrogen peroxide. All tests contents were stirred using a Teflon ®-coated stirbar Each test was conducted in a 1.5 liter glass reaction cell. Approximately 1300 mL of contaminated groundwater was poured into the reaction cell and subject to 30 minutes of treatment, including the treatment parameters as delineated in the table above. Following the conclusion of each test, groundwater samples were collected from the test cell and refrigerated. Subsamples can be analyzed for volatile fatty acids (VFA) and petroleum fractions.

Example 2

Ratio of Total Hexadecane Degraders to Total Heterotrophs

Bacteria in groundwater were enumerated by the plate count method essentially according to Standard Methods (18th Ed.) 9215 C, using one-third concentration of Nutrient Agar. Hexadecane degraders were plated on Noble Agar and grown in an atmosphere of hexadecane as the sole carbon source. Both total and specific degraders (e.g., bacteria) were incubated under aerobic conditions.

Incubation on the nutrient agar in hexadecane was inspected daily. As it is known that bacteria near an ozone injection source are reduced in number, observation of bacteria indicate that those bacteria must have the capacity for rapid regrowth. Inspection showed that four different colonies of bacteria emerged with very rapid regrowth. These colonies were then inspected under microscopic examination to identify the bacterial types present. A subsample can then be taken for genetic probe analysis and bacterial genotyping.

Based on these results, certain characteristics can be identified regarding the ozonophilic bacteria, including:

(1) isolation from petroleum-contaminated groundwater and soil subjected long-term to ozone pulsing;

(2) capacity for rapid growth (e.g., greater than 100,000 cfu per hour) when exposed to 10 to 100 ppmv ozone and plated on Noble Agar and grown in an atmosphere of hexadecane and incubated under aerobic conditions;

(3) maintaining a high ratio (e.g., 1.0 to 1.3) of total hexadecane degraders to total heterotrophic bacteria (the nearly 1:1 ratio of heterotrophic to hexadecane degrading bacteria being an indication that the bacteria are acclimated to fuel containing alkanes such as hexadecane);

(4) capacity to quickly degrade volatile fatty acids (VFAs) (the low level (<0.1 mg/L) of VFAs from samples of rapidly growing hexadecane degraders (10-100 ppmv ozone) being an indication that the high number of aerobic bacteria are rapidly consuming VFA products of petroleum degradation).

One of the fast growing bacteria found was a *pseudomonas* sp. The genus *pseudomonas* has been found previously after oxidation of PAHs (Richard Brown et al., "Combining Oxidation and Bioremediation for the Treatment of Recalcitrant Organics", Fourth International In situ and On-site Bioremediation Symposium: Volume 4 Chemical and Physical Processes in Support of Bioremediation, Battelle Press, Columbus, Ohio, pp. 457-462, 1997) and following ozone treatment of diesel fuel (Jung et al., "Treatment of PAH Contaminated Soil by Ozonation, Soil Washing and Biological Treatment", Abstracts, The Second International Conference on Oxidation and Reduction Technologies for In-Situ Treatment of Soil and Groundwater, Nov. 17-21, 2002, Toronto, Canada.). Generally, it has been assumed that they occur due to highly oxygenated (e.g., aerobic) conditions and developed fragmented alkane or phenolic by-products. Jung et al. dealt with high ozone concentrations which decreased bacterial concentrations. This differed from the instant application wherein rapid, repeatable growth is observed when lower concentrations of ozone (e.g., 1 to 300 ppmv) are used.

Example 3

Bacterial Analysis

One isolate bacterial colony (ID=$10^{-3}$; also referred to as a "creamy" colony) was found to be highly motile with very small rods. The isolate colony tested oxidase positive and there was no evidence for anaerobic respiration with nitrate as terminal electron acceptor. The isolate colony appeared to have strictly molecular-oxygen dependent growth and was identified as being a member of the genus *Pseudomonas* or a new realignment made in this genus.

The agar medium with this creamy colony type also exhibited a very "thin," nearly transparent colony thereon. This also turns out to be high motile, oxidase positive, colony capable of anaerobic growth with nitrate as electron acceptor (thus, able to carry out denitrification or nitrate respiration). Several members of *Pseudomonas* (or other related genera) are characterized by this trait.

Thus, analysis of the bacterial population of the samples described above indicate the presence of several genera and species; including a *pseudomonas* sp. 1 (small rods, oxidase positive, nonanaerobic) and a *pseudomonas* sp. 2 (motile, oxidase positive, anaerobic).

Example 4

Pre-Treatment Evaluation

Site investigation, to define the extent of spill both vertically and horizontally, was conducted as follows. A total of ten boreholes were manually advanced through the unsaturated zone to slightly below the saturated groundwater interface using a hollow probe and slotted intake. Soil gas samples were collected and processed through a photoionization detector (PID) system (HNu Model GP101). Groundwater interface samples were collected from each borehole location. The groundwater samples were screened from each monitoring well and at each borehole for ionizable, dissolved petroleum compounds using a portable gas chromatograph (HNu Model 301 GC). Three of the groundwater samples were submitted for laboratory analysis as the "worst-case"/ largest peak area samples identified from the field GC screening efforts.

A groundwater elevational survey was performed using six (6) monitoring wells. Inspection of the wells showed no sheen or separate phase product present on the water table. Laboratory results indicated exceedance of groundwater clean-up standards (2,200 µg/L and 4,400 µg/L of n-C9 and n-C18 aliphatic hydrocarbons, respectively. There was no indication that the area of contamination migrated offsite. Roughly, an elliptical area 60 feet long and 30 feet wide bounded the regions of hydrocarbon contamination.

Example 5

Installation of Treatment System/Operation

Installation of a system for perfusing air and ozone below the groundwater for remediative treatment of soil and groundwater included insertion of Spargepoint® diffusers. During operations, negative pressure was applied to the cellar to prevent fugitive vapors from invading the property buildings. During a five-week period, air/ozone gas and liquid hydrogen peroxide were added in areas of highest soil and groundwater contamination. Approximately 60 gallons of 5% solution of hydrogen peroxide was injected as a catalyst to enhance chemical oxidation of the petroleum-impacted soil and groundwater. Sampling for soil and groundwater extractable petroleum hydrocarbons, groundwater dissolved oxygen (DO), oxidation-reduction potential (ORP) and temperature elevations were performed periodically to assess system performance.

The gas/liquid introduction used a flow of 4 cfm, consuming about 5 gallons/day of hydrogen peroxide in a 5-8% solution. The total amount of oxygen delivered per day could be broken down as follows:
System Delivered:
Oxygen in air: 50 kg/day
Oxygen in ozone: 0.3 kg/day
Oxygen in peroxide: 1.2 kg/day (5 gal/day, 5-8% solution)
Intermittent dosing (1 week per month)
Ozone depleted rapidly from the point of injection. A series of miniature points were placed at 10-foot intervals from injection and the ozone gas concentration was measured from the headspace of bubbles in solution. The injected concentration of 250 ppmv ozone decreased to 6 ppmv within 20 feet of injection. By comparing the groundwater DO and ORP results, the effective radius of influence was found to be about 30 feet to maintain a mean concentration of DO above 1.0 mg/L. In the center of the plume (e.g., MW-3), the concentration of dissolved oxygen rose from about 1.4 to about 6.4 mg/L during treatment. Redox potential rose from about 45 to about 200 mV. The treated soil rose in temperature from 9° C. (48.2° F.) to 13 to 19.5° C. across site, about a 5-6° C. (9-11° F.) rise.

After approximately 10 weeks of treatment, the Extractable Petroleum Hydrocarbon Method ("EPH"; Massachusetts Department of Environmental Protection) components had consistently declined to levels below applicable maximum allowable contaminant level ("MCL") according to the Massachusetts Contingency Plan ("MCP"). Method GW-1 and GW-1/s-1 groundwater and soil cleanup standards. Further system monitoring parameters indicated dissolved oxygen levels and redox potential commensurate in change with effective treatment conditions. The remediation was operated over a period of five months (equivalent to four months continual operation due to suspension of operation during night time).

Example 6

Site Treatment Protocol

The correct volume and mass of ozone can be delivered to a sample or site by a single microporous Spargepoint® (HYDE, Kynar, stainless steel), manifolded to run multiple Spargepoint® diffusers simultaneously with single or double feed lines, which can be installed in a stacked vertical array (clustered) or fed by a special multi-channel tubing with wrap-around crimped microporous stainless steel or microporous cylinders with swage-like locks and penetrating tube which can be slid into place before installation with a hollow stem auger or equivalent insertion device.

Tests were conducted on groundwater samples near the source of the fuel spill under remediation about 48 hours after completion of treatment. Background samples of petroleum-enriched groundwater (i.e., before ozone injection) contained low levels of total hexadecane degraders (<500 cfu). Upon microsparging for about 30 minutes with ozone (10-100 ppmv), the bacterial population increased to about 500,000 to 1,000,000 cfu. Concentrations at 300 ppmv appeared lethal to the bacteria, but 10 ppmv was found to be exceptionally stimulating to the bacteria. Considering normal attenuation with distance from injection, pulsing with up to 300 ppmv would create a radius from about 5 feet to about 30 feet of ozone within the 0.5 to 100 ppmv range—ideal for encouraging bacterial breakdown while providing levels of ozone capable of fragmenting the aliphatic chains of the fuel oil components.

Simultaneous analysis of aliphatic C9-C36 hydrocarbons showed an increase in small carbon chains (e.g., C9-C16) while substantial reduction of longer chain aliphatics (e.g., C18-C36) occurs with ozone and ozone/peroxide addition. The bacterial populations utilize the fragments as carbon sources during their spectacular growth (i.e., proliferation) under the 10 and 100 ppmv ozone concentration treatment conditions. Reduction of methyl naphthalene, acenaphthalene, benzo(a)anthene, dibenzo(a,h)anthracene, and benzo(k) fluoranthene was also occurring in the aromatic fractions.

Ozone concentrations thus can vary depending on the amount of depletion of bacteria that is tolerable in regions proximate to the point of entry of the ozone, the type of bacteria, and the method and frequency of application. Continuous treatment refers to a steady, or essentially uninterrupted flow, while pulsed applications refer to non-steady or small interruptions (e.g., regular, interval, rhythmic) in the flow. For instance, in a continuous treatment ozone can be introduced in a range of about 0.5 to about 100 ppmv, preferable in a range of about 5 to about 80 ppmv; whereas, if introduced in a pulsed manner the ozone can be introduced in higher ranges, especially if longer intervals are provided between pulses of the ozone (e.g., introduction from 10 to 500 ppmv, if there is one hour between pulses). Concentration can also be determined based on the corresponding dissolved ozone concentration, for example, ozone is utilized to provide a dissolved ozone concentration in a range between about 0.5 and about 10 mmol/liter.

Example 7

Analysis of Treated Site After Treatment Cessation

Groundwater wells at the treatment site were reexamined for total heterotrophic bacteria and total hexadecane degraders (cfu/mL) approximately nine months after cessation of ozone sparing of the treatment site. The table below summarizes the results as well as bench-scale tests results of ozone additions to well samples.

In the table, the following samples from monitoring wells with the designations (monitoring wells not shown) are: MW-7A (air addition), MW 7-3 (3 ppmv ozone addition), MW 7-10 (10 ppmv ozone addition), MW 7-100 (100 ppmv ozone addition), MW 7-300 (300 ppmv ozone addition), MW 7-300P (300 ppmv ozone+hydrogen peroxide addition).

The total hexadecane degraders upon exposure to 10 ppmv ozone dropped in number (i.e., 20,000 to 15,000) compared to previously where the hexadecane degraders increased ca. 10-fold (i.e., 100,000 to 1,000,000), indicating that the bacterial population at the site after cessation of treatment no longer is ozonophilic, or has reverted back to a "reducing condition" (e.g., wherein the relative population of ozonophilic bacteria is smaller, and ozone administration results in reduction (e.g., killing) of bacteria, particularly those genera and species that are not ozonophilic. Instead of growing when exposed to ozone, a decrease in the population is observed. This indicates a difference in bacterial population as compared to that where ozone treatment was applied, particularly after a period of acclimation, that is a period (e.g., few days, 2-3 weeks) where ozone treatment was applied and resulted in an environment such that the ozonophilic populations would proliferate.

TABLE 5

BACTERIAL ENUMERATION IN WELL SAMPLES
colony forming units (cfu)/mL

| Sample | Total Heterotrophs cfu/mL | Total Hexadecane Degraders cfu/mL |
|---|---|---|
| MW 7 | 35,000 | 20,000 |
| MW 2 | 11,000 | 3,000 |
| MW 3 | 80,000 | 48,000 |
| MW 4 | 50,000 | 20,000 |
| MW 7A | 45,000 | 12,000* |
| MW 7-300 | <400 | <400 |
| MW 7-100 | 50,000 | 12,000 |
| MW 7-10 | 70,000 | 15,000* |
| MW 70-300P | <400 | <400 |
| MW 7-3 | 20,000 | 20,000* |
| Detection limit | <400 | <400 |

*The hexadecane degraders grew as very small colonies, as if stressed.

Permanganate Coated Ozone for Groundwater and Soil Treatment with In Situ Oxidation Application of permanganate using current practices has disadvantages. For example, permanganate is poorly reactive with 1,4 dioxane and benzene, limiting its use with certain mixtures of these compounds with chloroethenes. When applied as a liquid wash, permanganate produces carbon dioxide gas ($CO_2$) and manganese dioxide ($MNO_2$), a precipitate, which slows down the effectiveness of the permanganate over time.

Typically, when released into saturated soils at the top of an aquifer, the permanganate tends to displace water because of its density and moves downwards, often irregularly according to conditions of the soil, e.g., if the soil is partially laid down in layers the permanganate can move in fluvial channels, and so forth.

Permanganates may be involved in secondary reactions with soil or bedrock matrix. Such secondary reactions can occur for example with permanganates such as potassium or sodium permanganates. That is, the permanganates tend to react excessively with the soil minerals, lessening the permanganates efficiency as an oxidant. Examples of secondary reactions include those involving metallic or nonmetallic cations such as iron ($Fe^{+2}$ or $Fe^{+3}$), manganese ($Mn^{+2}$ or $Mn^{+4}$), calcium ($Ca^{+2}$), copper ($Cu^{+2}$ and $Cu^{+1}$), chromium ($Cr^{+3}$ and $Cr^{+6}$), and so forth. These cations under oxidation can become involved in secondary reactions minimizing the effectiveness of the added potassium permanganate or sodium permanganate and causing undesirable by-products.

Some or all of these disadvantages can be overcome by using permanganate or a precursor, e.g., potassium manganate with ozone, such as in a coating on microbubbles entrapping an air/ozone gas mixture. Generally, the microbubbles are of the order of 0.1 microns to 200 microns.

Figure 9:
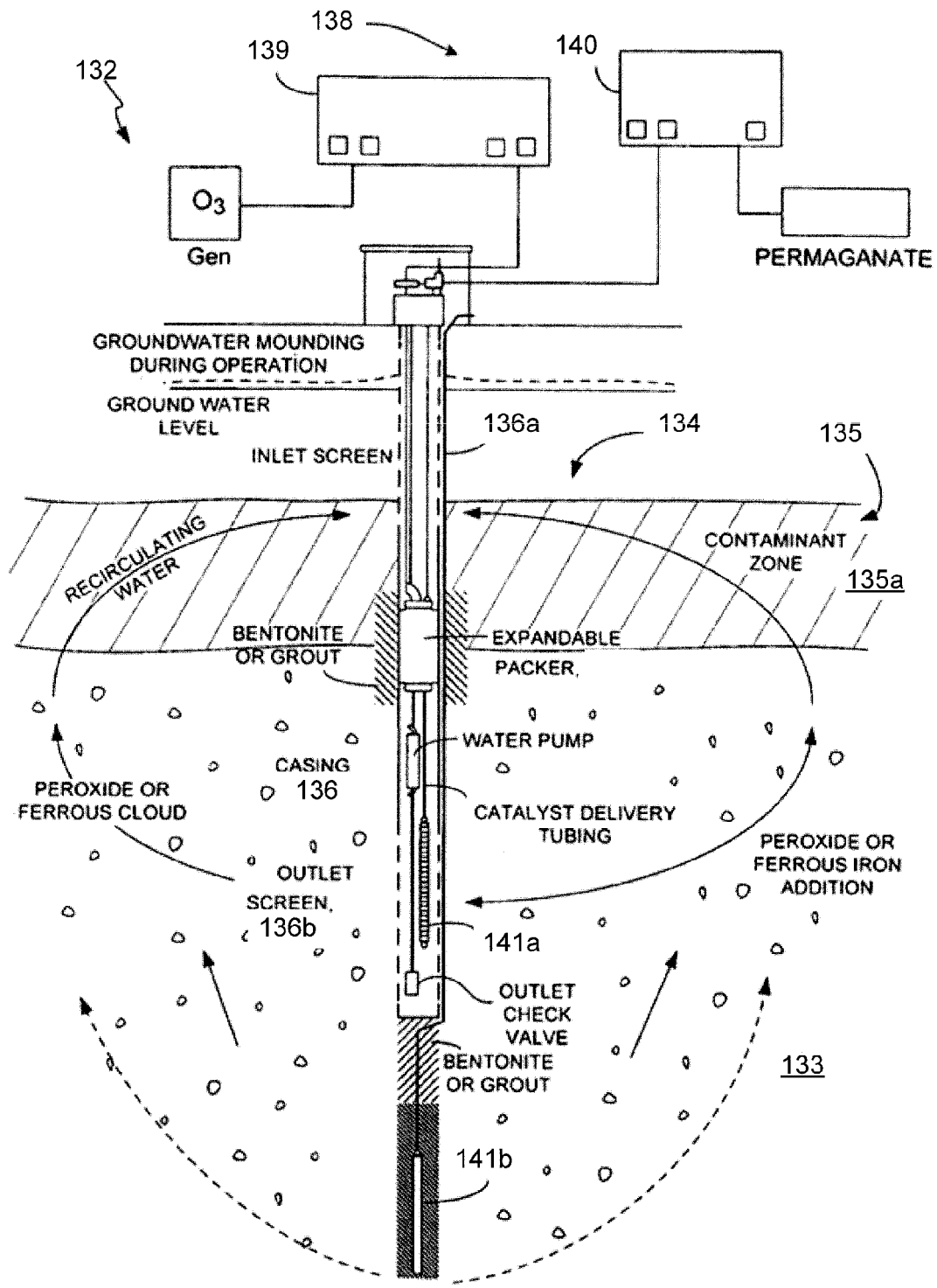
FIG. 9 is a diagram depicting an apparatus for a recirculation well system.

Referring to FIG. 9, an example for a treatment system 132 to treat contaminants in a subsurface aquifer 133 includes a sparging apparatus 134 that is disposed through a soil formation 135. In this arrangement, the sparging apparatus 134 is disposed through a soil formation 135 e.g., a vadose zone 135a and an underlying aquifer 133. The sparging apparatus 134 includes a casing 136 positioned through a borehole disposed through the soil formation 135. Casing 136 has an inlet screen 136a disposed on an upper portion thereof and an outlet screen 136b disposed on a bottom portion thereof. Disposed through casing 136 is a first microporous diffuser 141a. Alternatively, a slotted well-screen could be used. Microporous diffuser 141a is a laminate microporous diffuser. A second microporous diffuser 141b is disposed in a borehole that is below the borehole containing casing 136, and is surrounded by a sand pack and isolated by bentonite or a grout layer from the borehole that has first microporous diffuser 141a. Also disposed in the casing is a packer that isolates upper screen 136a from lower screen 136b and appropriate piping to connect sources of decontamination agents to microporous diffusers 141a, 141b. When fluid is injected through microporous diffusers 141a, 141b, packer, screens 136a, 136b and a water pump 136 enable a re-circulation water pattern to be produced in the soil formation.

Figure 10:
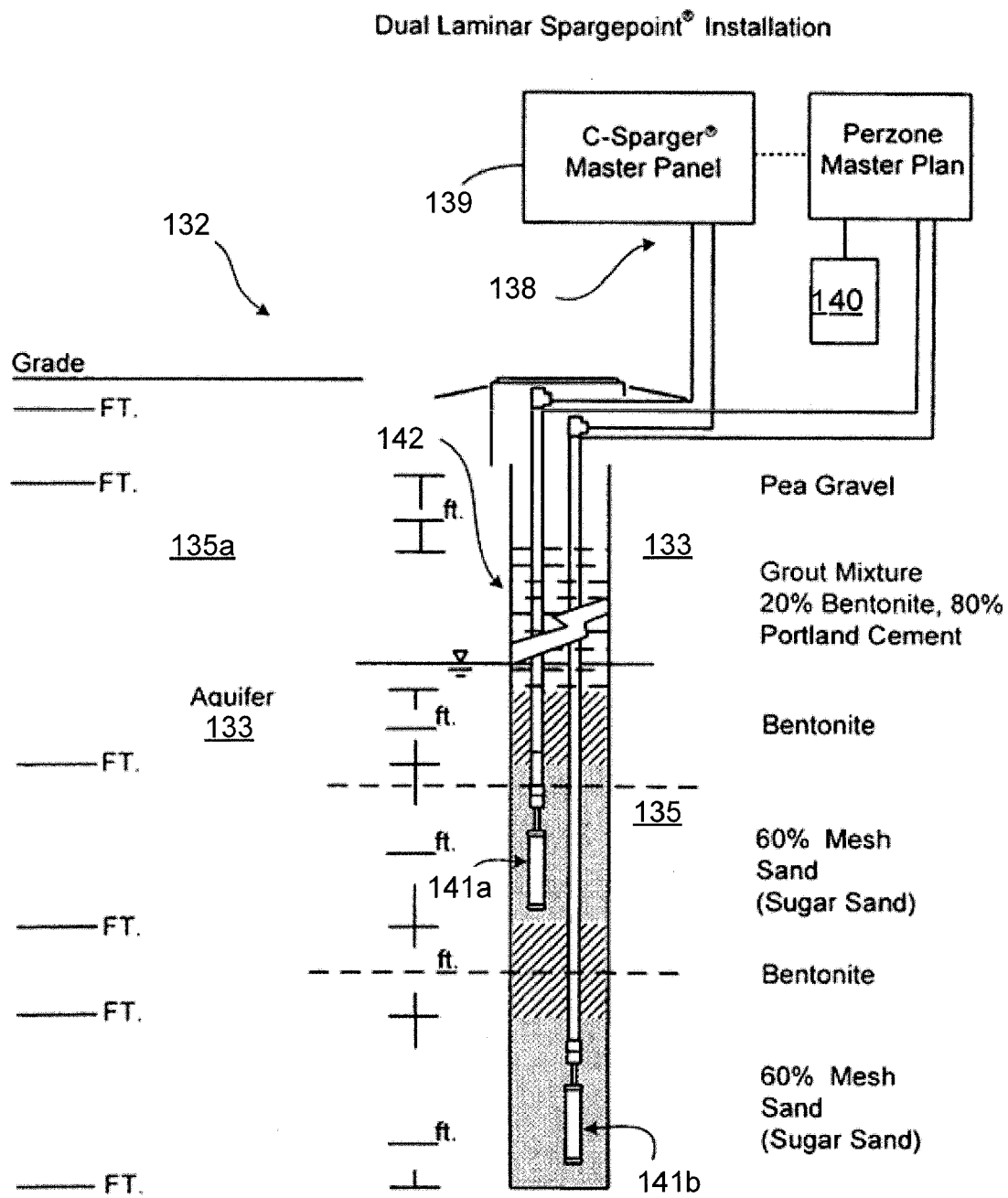
FIG. 10 is a diagram depicting an apparatus for a dual point well system.

As shown in FIG. 10, other arrangements are possible. For instance, the arrangement could use two microporous diffusers packed in a sand pack, e.g., a 60 mesh sand pack, which are separated by a bentonite layer. This arrangement is an example of a non-recirculation arrangement thus obviating the need for the packer for instance. Still other arrangements are possible.

Arrangement 132 (or 132') also includes apparatus 138 including a gaseous decontaminate oxidizer apparatus 139 and a liquid oxidizer supply apparatus 140 that supplies potassium or sodium permanganate or a permanganate precursor such as potassium manganate. Generally, the gas sources on the oxidative side can be air, oxygen, and ozone. Some of the sources can be supplied via the ambient air, e.g., an oxygen generator and an ozone generator can be used to supply oxygen and ozone from air. The liquid supply apparatus feeds a liquid mixture microporous diffusers 141a, 141b. The liquid source is a permanganate (potassium or sodium) solution for example. The system feeds microporous diffusers 141a, 141b with the gas stream, typically air and ozone through a central portion of the microporous diffuser producing microbubbles that exanimate from the central portion of the microporous diffuser where they come in contact with the permanganate solution, producing microbubbles with a permanganate coating on the bubbles.

Typically, the permanganate solution is maintained at a molar ratio of about 1-3 to 1 (permanganate to ozone), more specifically, 1 to 1 for efficient reactivity. This is equivalent to about 3 grams of permanganate to 1 gram of ozone (2.47 gms. $MnO_4^-$ to 1 gm $O_3$).

Under field conditions, permanganate, like peroxide, would tend to react more frequently with soil minerals, requiring a ratio of 1-20 to 1 or 1 to 20 times (more specifically 4-20 to 1) the ozone mass weight to compensate for soil natural oxidant demand (NOD) loss. The air/ozone mixture can have ozone up to about 10% volume as a gas entrapped in microbubbles, and potassium permanganate as a liquid coating over the microbubbles.

Several advantages are provided by coated microbubbles entrapping an air-ozone gas, with the sodium or potassium permanganate. Because permanganate is transported with microbubbles, it is actively dispersed rather than relying on density alone to distribute the permanganate. Thus, the microbubble transport mechanism provides better diffusion and distribution of permanganate laterally, since buoyancy will push the coating laterally and upwards through the formation, reducing the tendency to form dense vertical chimneys with only lateral spreading in highly permeable layers by downwards density spreading.

In addition, the density of the permanganate coating on the microbubbles allows for the adjustment of the buoyancy of the coated micro or nano sized microbubbles, since with a thick enough coating neutral buoyancy can be reached.

The coating of sodium or potassium permanganate on the microbubbles drawing contaminates such as highly volatile or volatile organic compounds to permanganate coating according to Henry's Constant, and thus reducing side reactions of the sodium or potassium permanganates with mineral surfaces in the soil substrate.

The combination of the ozone-air in the microbubbles and the sodium or potassium permanganate increases the oxidation potential of the permanganate, allowing treatment of 1,4-dioxane, mixed in with chloroethenes for example. This is an especially commercially useful example because in states such as California the compound 1,4-dioxane was often added to containers holding chloroethenes to inhibit corrosion of the container. In California the 1,4-dioxane the maximum permissible contaminant level (MCL) is set at 4 ppb, an even more stringent level than levels set for the chloroethenes.

Figure 11:
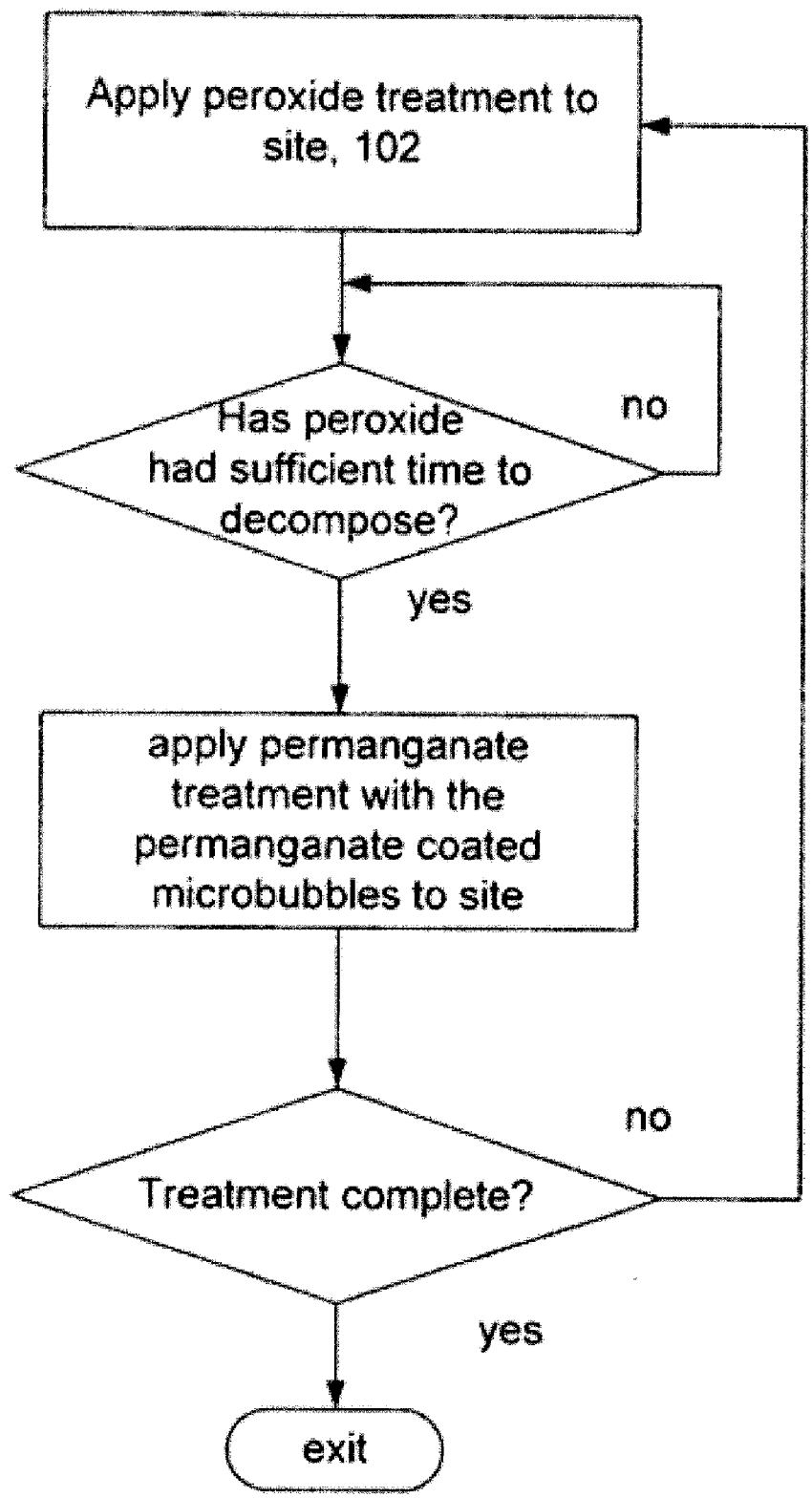
FIG. 11 is a flow chart of another treatment flow.

Referring to FIG. 11, another treatment flow is shown. This treatment involves the use of a peroxide treatment followed by permanganate treatment with permanganate coated microbubbles. A preferred treatment with peroxide is disclosed in U.S. Pat. No. 6,436,285 entitled "Laminated Microporous Diffuser" and/or U.S. Pat. No. 6,582,611 entitled "Groundwater and Subsurface Remediation," both of which are incorporated herein by reference, although other treatments could be used such as direct injection of a peroxide, such as hydrogen peroxide. The peroxide treatments disclosed in the above applications involve the use of peroxide coated microbubbles.

The treatment flow uses a hydro peroxide or hydrogen peroxide treatment e.g., such as a Perozone™ treatment (available from Kerfoot Technologies, Inc. Mashpee, Mass.) followed by treatment with permanganate. Generally, the permanganate is injected after the hydrogen peroxide has had a sufficient time to decompose. Typically, the time for hydrogen peroxide to decompose is about 3 to 5 days. This can be site specific, based upon the carbonate content of the soil at the site. Groundwater sampling and peroxide analysis can be conducted to confirm the absence of peroxide.

This treatment flow would be useful for treating VOCs (chloroethenes) imbedded in other petroleum products (machine oil, diesel, TPH, etc.), which need digestion of the petroleum products to free the solvents for reaction. Other contaminants include pentachlorophenol (PCP) mixtures in mineral reactions where aromatic ring breaking with the higher oxidation potential Perozone™ precedes the permanganate reactions with remaining chloroethene products are other possible procedures. These would involve a large number of aromatic and saturated ring compounds (chlorinated PAHs, PCT, Cl pesticides) whose ring structure needs to be opened for permanganate attack on the chlorinated ethenes or ethanes.

Also supplied to the microporous diffusers can be promoters or nutrients, as well as catalyst agents 42 including iron containing compounds such as iron silicates, ferrous iron, acetic acid, or palladium containing compounds such as palladized carbon or other transition metals in acid solution. In addition, other materials such as platinum may alternatively be used. The promoters or nutrients can be introduced with the permanganates.

The mixture of air/ozone affects substantial removal of contaminants such as various man-made volatile hydrocarbons including chlorinated hydrocarbons, chlorinated olefins such as tetrachloroethylene, trichloroethylene, cis-1,2-dichloroethene and vinyl chloride and other compounds e.g., aromatic ring compounds, propellants, explosives, and so forth that are found as contaminants.

The electronic and mechanical system to control the sparging apparatus 132 or 132' includes a gas pump and a liquid pump that are controlled via a mechanical time sequencer, or computer based controller, as discussed below, either of which is programmed to deliver a selected mass of each material per unit time producing a mixture of predetermined oxidation potential. The oxidation potential, the mass/time, pressure, and time sequence are set electronically. An oxygen generator feeds an ozone generator, allowing the ratio of ozone to oxygen to be set. The liquid delivered is water and permanganates.

A less efficient technique to introduce liquid would include separating gas introduction and liquid introduction in the substrate by using sand-packing around a central gas introduction tube or by sequentially flooding the region with a liquid, like a permanganate, above or around a single point and sending a fine bubble stream through a fine diffuser through the mixture. A secondary siphon-effect could be developed but the uniformity of coating would not be as controlled as with the techniques described above.

Figure 12:
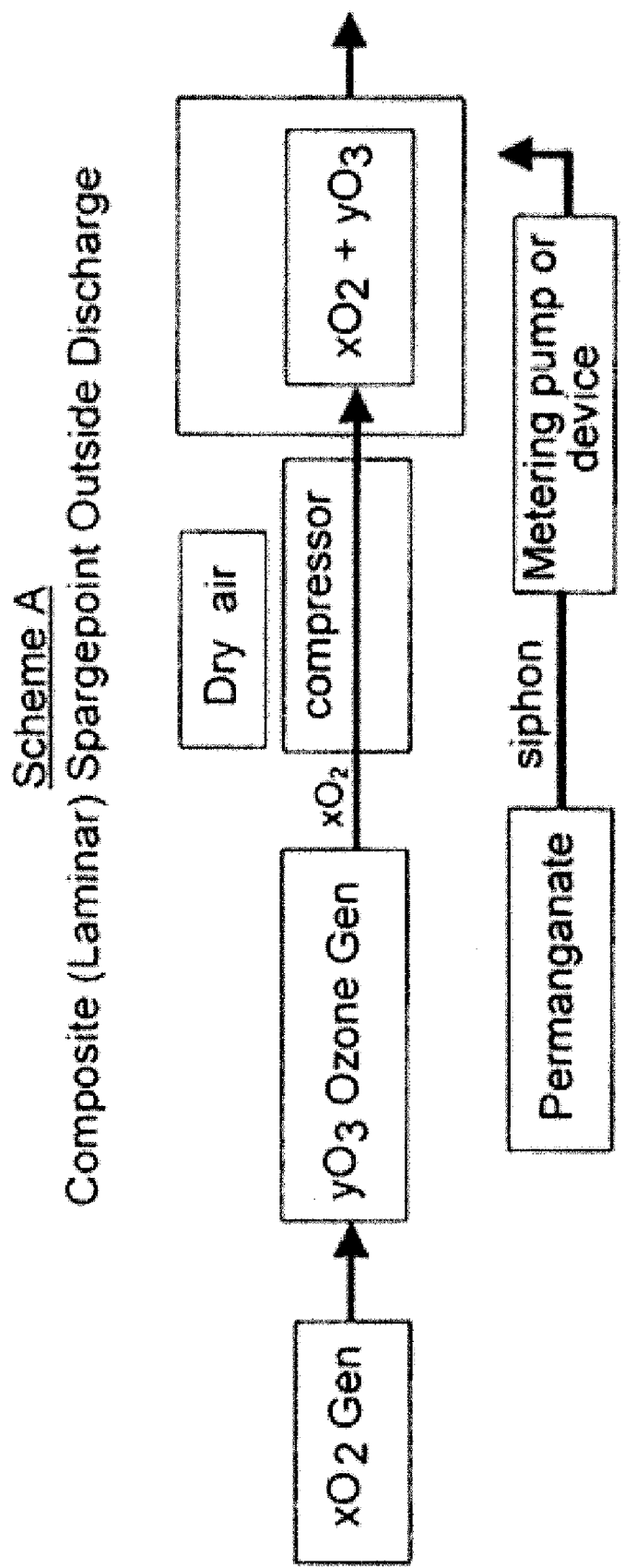
FIGS. 12-14 are diagrams depicting various treatment configurations.

FIG. 12 shows a composite Laminar microporous diffuser arrangement (e.g., a Laminar Spargepoint® described in U.S. Pat. Nos. 6,436,285 and 6,582,611 or obtainable from Kerfoot Technologies, Inc.) that produces an outside discharge of air/ozone bubbles having a coating of permanganate. To withstand higher ozone concentrations to maintain low molar ratios with permanganate, the Laminar Spargepoints® are constructed of Kynar® and/or stainless steel. Kynar® is a registered trademark of Elf Atochem North America, Inc. for a Polyvinylidene Fluoride (PVDF) high molecular weight thermoplastic polymer with excellent chemical inertness.

Figure 13:
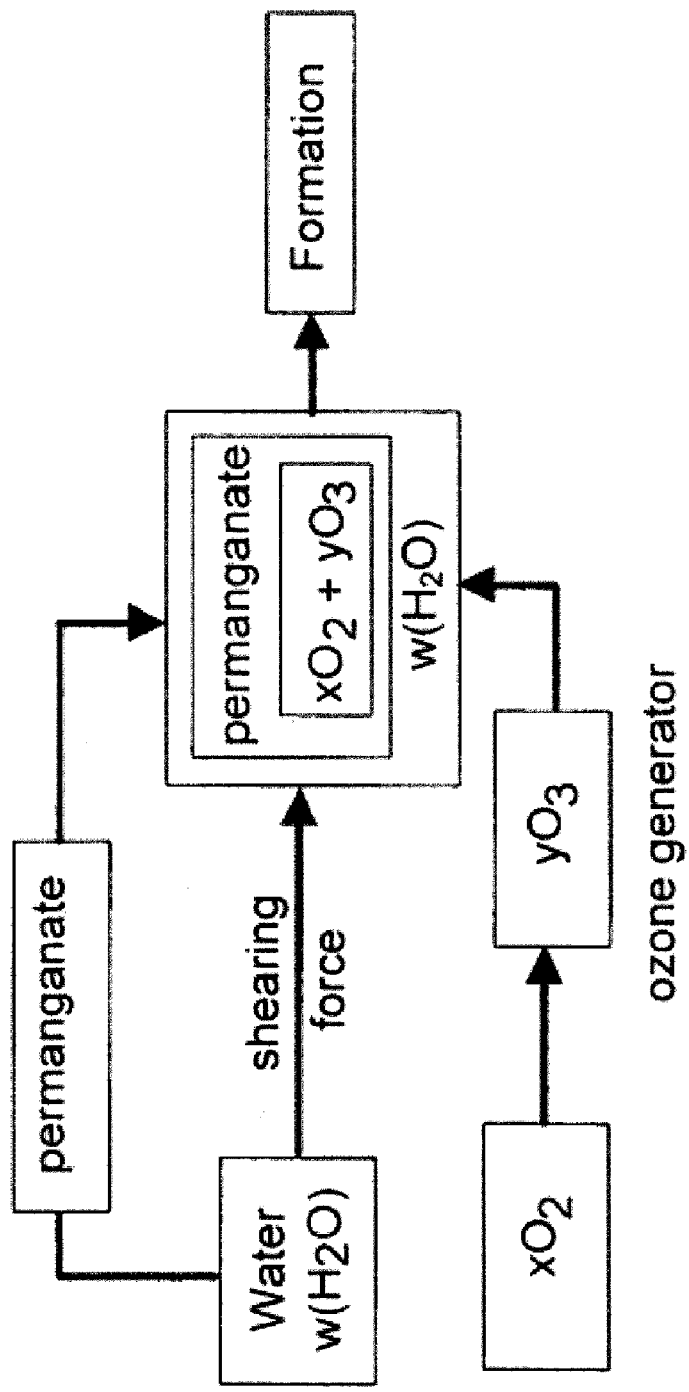

FIG. 13 shows a central water flow through an inverted cylindrical microporous diffuser, e.g., a Spargepoint® with an interior discharge (nozzle). The arrangement involves the discharge of water through the center of a microporous double cylinder with a non-permeable sheath. The gas enters an outer zone between an outermost plastic or stainless steel barrier and an inner microporous (0.5 to 200 micron) cylinder including support material (rings or mesh) and flows towards the center. Liquid is drawn into a microporous hydrophilic layer and coats a gas stream passing there through. The liquid and gas flows may be subject to pulsing (±5 psi) of their flows at frequent intervals (e.g., 0.5 to 10 times/sec) to provide an internal shear as the bubbles exit against the shearing force from the water or liquid velocity. With this arrangement nano to micro-size bubbles can be produced to flow in a water stream out from a well screen (either re-circulated vertically or provided from surface tank, flowing outwards or towards a laterally-located withdrawal well).

Figure 14:
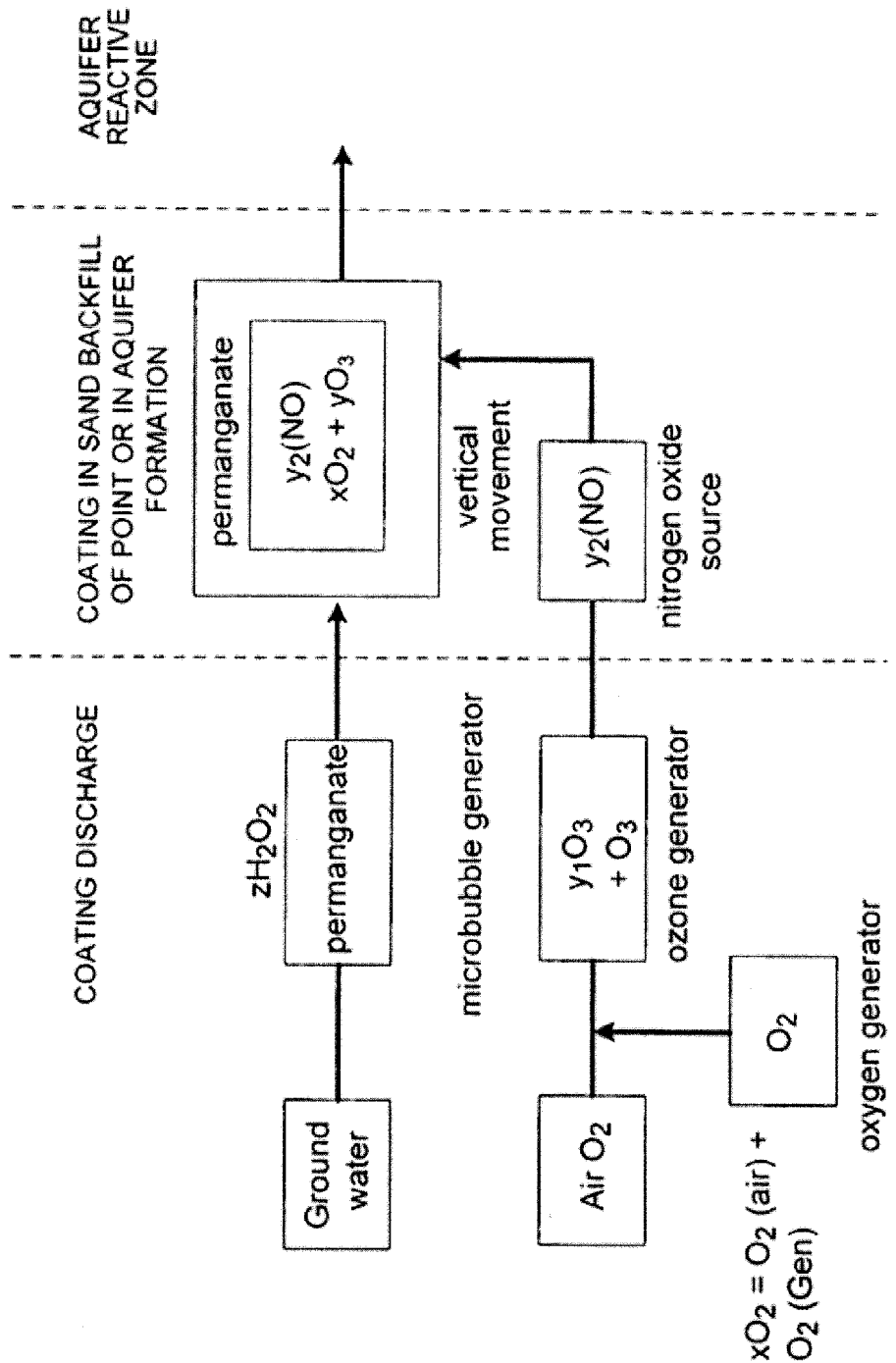

FIG. 14 shows a vertical separation of permanganates with lower oxygen release. In the arrangement of FIG. 13, vertical separation occurs between the cylinders of liquid introduction and gas introduction. The microporous gas generator is placed below the liquid generator so that the rising microbubbles pass through the liquid addition. The introduction cylinders can be segregated or supplied by a line passing through the center of the other. In either case, the bubbles rise while the denser upper liquid falls. A feed tubing arrangement can be configured with a line inside a line or by parallel tubes with an external sheath that is either wrapped or molded about the tubes.

The laminar microporous diffusers, U.S. Pat. Nos. 6,436,285 and 6,582,611 or obtainable from Kerfoot Technologies, Inc. (gas/liquid Spargepoints®) or equivalents, deliver gas and liquid with the permanganate to porous zones (vadose or saturated). The microporous diffuser produces microbubbles that siphon a liquid coating, as bubbles pulsed through capillary pores, yielding a water/coating liquid/gas/coating liquid/water peristaltic transport through microscopic capillary pores of the soil. The greater the hydrostatic pressure existing on the microporous diffuser, the higher the siphoning pressure produced. This indicates that with Boyle's Law of increased pressure, the smaller the internal volume of the bubble causes a concomitant enlargement of the microbubble due to capillary (meniscus) pressure to accommodate a higher surface area of the microbubble (or microcylinder) in the capillaries.

The cylindrical microporous diffuser, in which the gas is sent through the center of the microporous diffuser and through micropores across a sandwiched hydrophobic microporous layer connected to the liquid supply, is the most efficient approach to produce the flow. The intense negative pressure developed during operation occurs without any pump power provided. A metering mechanism is desirable to maintain a constant flow of liquid, but if sufficient volume is not supplied, the liquid can be subjected to sufficient vacuum pressure to produce boiling (degassing) of the liquid. A vacuum relief check valve for each liquid source can be used to increase flow during these conditions.

The system uses air-ozone sparging where bubbles of air-ozone are injected into treatment areas. When air is bubbled through ground water in soil pores, dissolved VOCs transfer from the liquid to gas phase in accordance with Henry's Law.

In accordance with Henry's Law, dissolved VOCs are driven into a gas phase and the gaseous ozone is driven into an aqueous phase. This will result in various reactions occurring at the bubble-liquid interface, whether in the gas-film or liquid-film of the bubble. Whether the primary decomposition reaction is occurring in the gaseous or liquid phase, oxygenates are driven by partitioning into the bubble environment. The smaller the bubble, the greater the surface-to-volume ratio and the ability of the bubble to "strip" volatile organics (Kerfoot, et al., Tenth Annual Outdoor Actions Conference National Groundwater Association Columbus Ohio pp 77-97 (1996)).

The thin film theory of Henley and Seader (1981) Equilibrium State Separation Operations in Chemical Engineering Chapter 16, John White and Sons, New York, N.Y., as summarized in Kerfoot, W. B. (2002) "Microbubble Ozone Sparging for Chlorinated Ethene Spill Remediation." In: Innovative Strategies for the Remediation of Chlorinated Solvents and DNAPLS in the Subsurface, American Chemical Society, Division of Environmental Chemistry, Washington, D.C., describes the mass transfer of a reactant across a liquid and a gas film before it contacts the other reactant.

The high surface to volume ratio of micron-sized bubbles enhances the in-situ stripping capacity (partitioning from aqueous to gaseous phase) to allow effective extraction.

The Laminar Spargepoints® (or equivalent) are used to inject ozone and permanganates into the ground. The Laminar Spargepoints® are made of a microporous fluoropolymer material, or microporous stainless steel. As the ozone and permanganates are pumped into the points, they are pushed out through the micropores, forming a permanganate encapsulated ozone bubble. The contents of the bubble react with the contamination in the ground. Ozone may also be injected through microporous ceramic diffusers below liquid introduction by microporous or slotted screens.

Tubing

The tubing forms the connections between the C-Sparger® control panel and the hydrogen peroxide control panel to the laminar Spargepoints®. There are two types of tubing used. One is high density polyethylene or Kynar®, depending upon $O_3$ concentration for the lateral runs from the control panels to the wells. The other is Teflon® in the control panels and for the hydrogen peroxide flow from the wellhead to the laminar Spargepoint®. Other types of tubing that are resistant to ozone and hydrogen peroxide can be used.

Pulsing, Siphoning, and Residence Time for Maximizing Efficiency

Adjusting downwards the size of gas bubbles allows sufficiently slow rise time to allow adequate residence time for gas/aqueous reactions to go to completion. Pulsing allows the introduction of gas bubbles, coated with liquid or surrounded by liquid (if bubble diameter is equal to or greater than capillary pore size) to be introduced, and reside in the vicinity of the compounds of concern for reaction and move upwards during the next pressure event. Rise time in saturated sands is substantially reduced by reducing the diameter of the emitted microbubbles.

If a continuous gas flow were used instead of intermittent, a continuous gas channel would be produced (as envisioned by Clayton (1998)) interfering with liquid coating of the gas bubbles, lowering efficiency of reaction by rapidly transporting unreacted ozone gas into the vadose zone. Producing a continual gas flow (greater than 10 cfm through 0.010 inch slots, 1 meter long, 2 inches in diameter) can provide vertical gas travel times of greater than 2 meters/minute. In comparison, fine bubble production (0.5 to 50 micron size), can result in vertical travel times of 0.01 to 0.1 meters/minute. By extending the half-life of ozone from 0.5 to 30 hours, the residence time for reaction in a 6-meter vertical contaminated zone increases from 60 to 600 minutes, approaching the half-life of ozone.

Siphoning Effect

The movement of fine gas bubbles coated with liquid produces a lower pressure as the bubbles are injected out into the formation through Laminar Spargepoints®.

The higher the necessary gas pressure for operation against formation backpressure, the greater the negative pressure siphoning in liquid. This phenomenon may reflect smaller size microbubbles with higher surface-to-volume ratios evolving from Boyle's Law of pressure, requiring more liquid to cover the emitted gas volume. Surface tension of the liquid would cause more liquid to be delivered.

A number of embodiments of the invention have been described. Nevertheless, it will be understood that various modifications may be made without departing from the spirit and scope of the invention.

What is claimed is:

1. Deep well sparging method, comprising:
   delivering a first gas to a first cylinder, and
   delivering a second gas to a second cylinder of a microporous material, the first and second cylinders being concentric with one another.

2. The method of claim 1, further comprising:
   coupling a first inlet port to the first cylinder and coupling a second inlet port to the second cylinder.

3. The method of claim 2 further comprising coupling a first compressor to the first inlet port and coupling a second compressor to the second inlet port.

4. The method of claim 3, further comprising coupling an ozone generator to supply ozone to the first compressor and coupling a pump to supply air to the second compressor.

5. The method of claim 4, further comprising arranging the ozone generator and the pump so that the ozone generator siphons the ozone to the first or second cylinder.

6. The method of claim 5, further comprising supplying the ozone at a flow rate of 0.5-50 cubic feet per hour (CFH) and supplying the air at a flow rate of 2-20 CFH.

7. The method of claim 1, the first gas and second gas being mixed to form gas bubbles, at a well site.

8. The method of claim 1, further comprising:
   disposing the first and second cylinder into a well that is contaminated with various contaminants.

9. The method of claim 8, further comprising disposing the first and second cylinder in the well at a depth exceeding a depth that produces back pressure on an ozone generator connected to the first or second cylinder.

10. The method of claim 8 further comprising disposing a casing with an inlet screen and an outlet screen in the well.

11. The method of claim 10 wherein the inlet screen and outlet screen promote recirculation of water into the casing and through the well.

12. The method of claim 9, further comprising disposing the first and second cylinder in the well at a vertical depth in excess of 180 feet from the surface of the earth.

13. The method of claim 1, wherein delivering the first gas comprises delivering air to the first cylinder and wherein delivering the second gas comprises delivering ozone to the second cylinder.

14. The method of claim 1 wherein delivering the first gas comprises delivering ozone to the first cylinder and wherein delivering the second gas comprises delivering air to the second cylinder.

15. The method of claim 1, further comprising emitting bubbles of encapsulated ozone and/or air from the first and/or second cylinder.

16. The method of claim 15 wherein the bubbles or encapsulated ozone and/or air extract a vapor phase fraction of a volatile compound.

17. The method of claim 1, wherein delivery of the first and second gases mixes the gases within the first and second cylinders.

18. The method of claim 1, the first and/or second cylinder emitting bubbles having a size in a range of 0.5 to 200 microns.

19. The method of claim 1 further comprising including a pump to supply nutrients to the first cylinder or the second cylinder.

* * * * *